(12) United States Patent
Han et al.

(10) Patent No.: US 12,455,744 B2
(45) Date of Patent: Oct. 28, 2025

(54) TO-BE-EXECUTED INSTRUCTION PREDICTION METHOD AND SYSTEM

(71) Applicant: HUAWEI TECHNOLOGIES CO., LTD., Shenzhen (CN)

(72) Inventors: Bing Han, Beijing (CN); Yongyu Chen, Dongguan (CN); Nan Li, Beijing (CN); Taixu Tian, Dongguan (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 164 days.

(21) Appl. No.: 18/314,655

(22) Filed: May 9, 2023

(65) Prior Publication Data

US 2023/0367596 A1   Nov. 16, 2023

(30) Foreign Application Priority Data

May 10, 2022   (CN) .......................... 202210504984.1
Jul. 22, 2022   (CN) .......................... 202210866647.7

(51) Int. Cl.
 *G06F 9/30* (2018.01)
 *G06F 9/32* (2018.01)
 *G06F 9/38* (2018.01)

(52) U.S. Cl.
 CPC .......... *G06F 9/30058* (2013.01); *G06F 9/323* (2023.08); *G06F 9/3844* (2013.01); *G06F 9/3848* (2013.01)

(58) Field of Classification Search
 CPC ............... G06F 9/3005; G06F 9/30054; G06F 9/30058; G06F 9/30061; G06F 9/321;
 (Continued)

(56) References Cited

U.S. PATENT DOCUMENTS

| 5,434,985 A | 7/1995 | Emma et al. |
| 5,742,804 A * | 4/1998 | Yeh .......................... G06F 9/3836 712/237 |

(Continued)

OTHER PUBLICATIONS

Q. Jacobson, E. Rotenberg and J. E. Smith, "Path-based next trace prediction," Proceedings of 30th Annual International Symposium on Microarchitecture, Research Triangle Park, NC, USA, pp. 14-23 (Year: 1997).*

*Primary Examiner* — Andrew Caldwell
*Assistant Examiner* — Kasim Alli
(74) *Attorney, Agent, or Firm* — Leydig, Voit & Mayer, Ltd.

(57) ABSTRACT

An instruction prediction method and apparatus, a system, and a computer-readable storage medium relate to the field of computer technologies. The method includes: a processor obtains a plurality of to-be-executed first IBs, where any first IB includes at least one instruction to be sequentially executed, and the at least one instruction includes one branch instruction; searches, based on branch instructions included in the plurality of first IBs, at least one candidate execution path for a candidate execution path corresponding to the plurality of first IBs, where any candidate execution path indicates a jump relationship between a plurality of second IBs, and a jump relationship indicated by the candidate execution path corresponding to the plurality of first IBs includes a jump relationship between the plurality of first IBs; and predicts, based on the jump relationship between the first IBs, a next instruction corresponding to a branch instruction in each first IB.

16 Claims, 9 Drawing Sheets

(58) Field of Classification Search
CPC .......... G06F 9/322; G06F 9/323; G06F 9/324; G06F 9/3804; G06F 9/3806; G06F 9/3814; G06F 9/3844; G06F 9/3846; G06F 9/3848
See application file for complete search history.

(56) References Cited

U.S. PATENT DOCUMENTS

| | | | | |
|---|---|---|---|---|
| 6,014,742 | A * | 1/2000 | Krick | G06F 9/3808 |
| | | | | 712/236 |
| 6,185,675 | B1 * | 2/2001 | Kranich | G06F 9/3858 |
| | | | | 712/E9.056 |
| 6,308,322 | B1 * | 10/2001 | Serocki | G06F 9/30061 |
| | | | | 712/240 |
| 6,546,478 | B1 * | 4/2003 | Keller | G06F 9/3804 |
| | | | | 712/213 |
| 7,953,933 | B1 * | 5/2011 | Thaik | G06F 9/3808 |
| | | | | 711/125 |
| 2017/0322811 | A1 | 11/2017 | Abdallah | |
| 2024/0118895 | A1 * | 4/2024 | Zhang | G06F 9/30047 |

* cited by examiner

TO-BE-EXECUTED INSTRUCTION PREDICTION METHOD AND SYSTEM

CROSS-REFERENCE TO RELATED APPLICATIONS

This application claims priority to Chinese Patent Disclosure No. 202210866647.7, filed on Jul. 22, 2022 which claims priority to Chinese Patent Application No. 202210504984.1, filed on May 10, 2022. Both of the aforementioned applications are hereby incorporated by reference in their entireties.

TECHNICAL FIELD

This disclosure relates to the field of computer technologies, and in particular, to an instruction prediction method and apparatus, a system, and a computer-readable storage medium.

BACKGROUND

An instruction pipeline is a technology in which an instruction execution process is divided into a plurality of associated stages, and each stage is completed by a dedicated circuit. The instruction pipeline includes at least an instruction fetch stage and an execution stage. The instruction fetch stage is for fetching an instruction to be executed. The execution stage is for executing the instruction fetched in the instruction fetch stage, and determining a next instruction to be executed. If the instruction to be executed is a conditional branch instruction, the conditional branch instruction is usually followed by two branches, and different branches correspond to different next instructions.

SUMMARY

Because a next instruction that is to be executed and that corresponds to a specific branch can be determined only in the execution stage, an instruction prediction method is required, to predict the branch corresponding to the next instruction before the next instruction to be executed is determined. In this way, the instruction corresponding to the branch can be sent to the instruction fetch stage in advance, thereby improving instruction execution efficiency. In some technologies, an instruction corresponding to a branch of the conditional branch instruction is fixedly used as the next instruction to be executed. However, because a next instruction corresponding to only one conditional branch instruction can be predicted at a time, prediction efficiency of the related technologies is relatively low. In addition, because next instructions that are of different conditional branch instructions and that are to be subsequently executed may be different, prediction accuracy of the related technologies is relatively low.

This disclosure provides an instruction prediction method and apparatus, a system, and a computer-readable storage medium, to improve efficiency and accuracy of instruction prediction.

According to a first aspect, an instruction prediction method is provided. The method is applied to a processor, and the method includes: The processor obtains a plurality of to-be-executed first instruction blocks (IBs), where any one of the plurality of first IBs includes at least one instruction to be sequentially executed, and the at least one instruction includes one branch instruction; then searches, based on branch instructions included in the plurality of first IBs, at least one candidate execution path for a candidate execution path corresponding to the plurality of first IBs, where any one of the at least one candidate execution path indicates a jump relationship between a plurality of second IBs, and a jump relationship indicated by the candidate execution path corresponding to the plurality of first IBs includes a jump relationship between the plurality of first IBs; and finally predicts, based on the jump relationship between the plurality of first IBs, a next instruction corresponding to a branch instruction included in each first IB.

The method can be applied to a processor such as a network processor and a central processing unit (CPU) with relatively high service randomness, and has a wide disclosure scope. In addition, in the method, the candidate execution path corresponding to the plurality of first IBs is obtained based on the branch instructions included in the plurality of first IBs. Because the jump relationship indicated by the candidate execution path includes the jump relationship between the plurality of first IBs, the next instruction corresponding to the branch instruction included in each first IB can be directly predicted based on the jump relationship between the plurality of first IBs. Therefore, efficiency of predicting the next instruction corresponding to the branch instruction included in each first IB is relatively high. Because the jump relationship between the plurality of first IBs is indicated by the candidate execution path corresponding to the plurality of first IBs, the jump relationship between the plurality of first IBs may be different. In comparison with a manner in which an instruction corresponding to a branch is fixedly used as a next instruction to be executed in the related technologies, accuracy of the jump relationship between the plurality of first IBs obtained in the method is relatively high. Therefore, accuracy of predicting the next instruction corresponding to the branch instruction included in each first IB is relatively high, and instruction execution efficiency is relatively high.

In a possible implementation, the searching, based on branch instructions included in the plurality of first IBs, at least one candidate execution path for a candidate execution path corresponding to the plurality of first IBs includes: obtaining, based on the branch instructions included in the plurality of first IBs, a key corresponding to the plurality of first IBs, where different keys correspond to different candidate execution paths; searching the at least one candidate execution path for a candidate execution path corresponding to the key; and using the candidate execution path corresponding to the key as the candidate execution path corresponding to the plurality of first IBs. Because the key is obtained based on the branch instructions included in the plurality of first IBs, the method can reduce resources required for searching for the candidate execution path corresponding to the plurality of first IBs, thereby improving efficiency of searching for the candidate execution path corresponding to the plurality of first IBs.

In a possible implementation, the at least one candidate execution path and an index corresponding to each of the at least one candidate execution path are stored in a storage, and the index corresponding to each of the at least one candidate execution path and a key corresponding to each index are stored in a memory. The searching the at least one candidate execution path for a candidate execution path corresponding to the key includes: inputting the key into the memory, obtaining a target index that is output by the memory and that corresponds to the key, searching the at least one candidate execution path stored in the storage for a candidate execution path corresponding to the target index, and using the candidate execution path corresponding to the target index as the candidate execution path corresponding to the key. In the method, a process of searching for the candidate execution path corresponding to the key may be implemented based on a multi-level storage, and a manner of searching for the candidate execution path corresponding to the key is relatively flexible. A searching speed in the memory is relatively fast but storage resources are relatively limited, and a searching speed in the storage is relatively slow but storage resources are relatively sufficient. The method implements the searching for the candidate execution path corresponding to the key in a multi-level storage manner, so that efficiency of the searching for the candidate execution path corresponding to the key can be improved when relatively sufficient storage space is ensured to store the at least one candidate execution path.

In a possible implementation, the method further includes: Based on that the candidate execution path corresponding to the plurality of first IBs is not found in the at least one candidate execution path, the processor determines that the jump relationship between the plurality of first IBs is a reference jump relationship, and predicts, based on the reference jump relationship, the next instruction corresponding to the branch instruction included in each first IB. When the candidate execution path corresponding to the plurality of first IBs is not found, the method can also predict the next instruction corresponding to the branch instruction included in each first IB, thereby improving efficiency of obtaining the next instruction corresponding to the branch instruction included in each first IB. The method can be flexibly applied to different situations.

In a possible implementation, that the processor determines that the jump relationship between the plurality of first IBs is a reference jump relationship includes: The processor adds a target instruction between the first IBs, where the target instruction indicates that the jump relationship between the first IBs is the reference jump relationship. By adding, between the first IBs, the target instruction that indicates that the jump relationship between the first IBs is the reference jump relationship, the processor can complete jumps between the first IBs by executing the target instruction. The manner of indicating the jump relationship between the first IBs in the method is relatively simple.

In a possible implementation, after the processor determines the jump relationship between the plurality of first IBs, the method further includes: The processor stores, based on the jump relationship between the plurality of first IBs, execution sequence information and storage address information of the plurality of first IBs in an IB queue, where the execution sequence information indicates execution sequences of the instructions included in the plurality of first IBs, and the storage address information indicates storage addresses of the instructions included in the plurality of first IBs; sequentially obtains the execution sequence information and the storage address information of the plurality of first IBs from the IB queue; and sequentially obtains the instructions based on the execution sequences indicated by the obtained execution sequence information and based on the storage addresses indicated by the obtained storage address information, and executes the obtained instructions. By storing the execution sequence information and the storage address information of the plurality of first IBs in the IB queue, the processor can sequentially obtain the execution sequence information and the storage address information of each first IB based on a sequence of the plurality of first IBs in the IB queue. Efficiency of determining a first IB whose execution sequence information and storage address information need to be obtained is relatively high, and efficiency of obtaining the execution sequence information and the storage address information of the first IB is also relatively high.

In a possible implementation, the method further includes: When the obtained instruction is a branch instruction, in response to a fact that a predicted next instruction corresponding to the branch instruction is different from a next instruction that needs to be executed, the processor obtains at least one to-be-executed third IB based on the next instruction that needs to be executed, and predicts a next instruction corresponding to a branch instruction included in the at least one third IB. If the predicted next instruction corresponding to the branch instruction is different from the next instruction that needs to be executed, it indicates that some instructions in the plurality of to-be-executed instructions are not instructions that need to be executed. In this case, the at least one to-be-executed third IB is obtained based on the next instruction that needs to be executed, and a correct to-be-executed instruction can be obtained according to the method, so that accuracy of the to-be-executed instruction is ensured.

In a possible implementation, the method further includes: When the obtained instruction is a branch instruction, in response to a fact that a predicted next instruction corresponding to the branch instruction is different from a next instruction that needs to be executed, the processor deletes the execution sequence information and the storage address information that are of the plurality of first IBs and that are stored in the IB queue. The information stored in the IB queue is deleted, so that a storage space waste caused by occupation of incorrect information can be avoided.

In a possible implementation, the processor supports at least two threads, and the processor performs, on any one of the at least two threads, an operation of obtaining an instruction based on a storage address.

In a possible implementation, that the processor performs, on any one of the at least two threads, an operation of obtaining an instruction based on a storage address includes: When a resource is idle, the processor performs, on any one of the at least two threads, the operation of obtaining an instruction based on a storage address. The operation of obtaining an instruction based on a storage address is performed only when a resource is idle, so that when the obtained instruction is not an instruction that needs to be executed, the operation of obtaining an instruction performed on the thread can be prevented from affecting the operation of obtaining an instruction performed on another thread, thereby implementing zero penalty for an instruction obtaining error. The zero penalty for an instruction obtaining error means that when an operation of obtaining an incorrect instruction is performed on the thread, no resource required for performing the operation of obtaining an instruction on another thread is occupied.

According to a second aspect, an instruction prediction apparatus is provided. The apparatus is used in a processor, and the apparatus includes:

an obtaining module, configured to obtain a plurality of to-be-executed first instruction blocks IBs, where any first IB includes at least one instruction to be sequentially executed, and the at least one instruction includes one branch instruction;

a searching module, configured to search, based on branch instructions included in the plurality of first IBs, at least one candidate execution path for a candidate execution path corresponding to the plurality of first IBs, where any candidate execution path indicates a jump relationship between a plurality of second IBs, and a jump relationship indicated by the candidate execution path corresponding to the plurality of first IBs includes a jump relationship between the plurality of first IBs; and a prediction module, configured to predict, based on the jump relationship between the plurality of first IBs, a next instruction corresponding to a branch instruction included in each first IB.

In a possible implementation, the searching module is configured to: obtain, based on the branch instructions included in the plurality of first IBs, a key corresponding to the plurality of first IBs, where different keys correspond to different candidate execution paths; search the at least one candidate execution path for a candidate execution path corresponding to the key; and use the candidate execution path corresponding to the key as the candidate execution path corresponding to the plurality of first IBs.

In a possible implementation, the at least one candidate execution path and an index corresponding to each of the at least one candidate execution path are stored in a storage, and the index corresponding to each of the at least one candidate execution path and a key corresponding to each index are stored in a memory. The searching module is configured to: input the key into the memory, obtain a target index that is output by the memory and that corresponds to the key; search the at least one candidate execution path stored in the storage for a candidate execution path corresponding to the target index; and use the candidate execution path corresponding to the target index as the candidate execution path corresponding to the key.

In a possible implementation, the searching module is further configured to: determine, based on that the candidate execution path corresponding to the plurality of first IBs is not found in the at least one candidate execution path, that the jump relationship between the plurality of first IBs is a reference jump relationship, and predict, based on the reference jump relationship, the next instruction corresponding to the branch instruction included in each first IB.

In a possible implementation, the searching module is configured to add a target instruction between the first IBs, where the target instruction indicates that the jump relationship between the first IBs is the reference jump relationship.

In a possible implementation, the obtaining module is further configured to: store, based on the jump relationship between the plurality of first IBs, execution sequence information and storage address information of the plurality of first IBs in an IB queue, where the execution sequence information indicates execution sequences of the instructions included in the plurality of first IBs, and the storage address information indicates storage addresses of the instructions included in the plurality of first IBs; sequentially obtain the execution sequence information and the storage address information of the plurality of first IBs from the IB queue; and sequentially obtain the instructions based on the execution sequences indicated by the obtained execution sequence information and based on the storage addresses indicated by the obtained storage address information, and execute the obtained instructions.

In a possible implementation, the obtaining module is further configured to: when the obtained instruction is a branch instruction, in response to a fact that a predicted next instruction corresponding to the branch instruction is different from a next instruction that needs to be executed, obtain at least one to-be-executed third IB based on the next instruction that needs to be executed, and predict a next instruction corresponding to a branch instruction included in the at least one third IB.

In a possible implementation, the obtaining module is further configured to: when the obtained instruction is a branch instruction, in response to a fact that a predicted next instruction corresponding to the branch instruction is different from a next instruction that needs to be executed, delete the execution sequence information and the storage address information that are of the plurality of first IBs and that are stored in the IB queue.

In a possible implementation, the processor supports at least two threads, and the obtaining module is configured to perform, on any one of the at least two threads, an operation of obtaining an instruction based on a storage address.

In a possible implementation, the obtaining module is configured to: when a resource is idle, perform, on any one of the at least two threads, the operation of obtaining an instruction based on a storage address.

According to a third aspect, a computer system is provided. The computer system includes a processor. The processor is configured to execute program instructions or code, to enable the computer device to implement any instruction prediction method according to the first aspect. Optionally, the computer system further includes a memory, where the memory is configured to store the program instructions or code.

According to a fourth aspect, a computer-readable storage medium is provided. The storage medium stores at least one program instruction or code. When the program instruction or code is executed by a computer, the computer is enabled to implement any instruction prediction method according to the first aspect.

According to a fifth aspect, a communication apparatus is provided. The apparatus includes a transceiver, a memory, and a processor. The transceiver, the memory, and the processor communicate with each other through an internal connection path. The memory is configured to store instructions, and the processor is configured to execute the instructions stored in the memory, to control the transceiver to receive a signal and control the transceiver to send a signal. In addition, when the processor executes the instructions stored in the memory, the processor is enabled to perform any instruction prediction method according to the first aspect.

For example, there are one or more processors, and there are one or more memories.

For example, the memory and the processor may be integrated together, or the memory and the processor may be separately disposed.

In a implementation process, the memory may be a non-transitory memory, for example, a read-only memory (ROM). The memory and the processor may be integrated on a same chip, or may be disposed on different chips. A type of the memory and a manner of disposing the memory and the processor are not limited in this disclosure.

According to a sixth aspect, a computer program product is provided. The computer program product includes computer program instructions or code. When the computer program instructions or code are/is executed by a computer, the computer is enabled to perform any instruction prediction method according to the first aspect.

According to a seventh aspect, a chip is provided. The chip includes a processor, configured to execute program instructions or code, to enable a device including the chip to perform any instruction prediction method according to the first aspect.

For example, the chip further includes an input interface, an output interface, and a memory. The input interface, the output interface, the processor, and the memory are connected through an internal connection path, and the memory is configured to store the program instructions or code.

It should be understood that, for beneficial effects achieved by the technical solutions in the second aspect to the seventh aspect and the corresponding possible implementations in embodiments of this disclosure, refer to the foregoing technical effects in the first aspect and the corresponding possible implementations of the first aspect. Details are not described herein again.

DESCRIPTION OF EMBODIMENTS

Figure 1A:
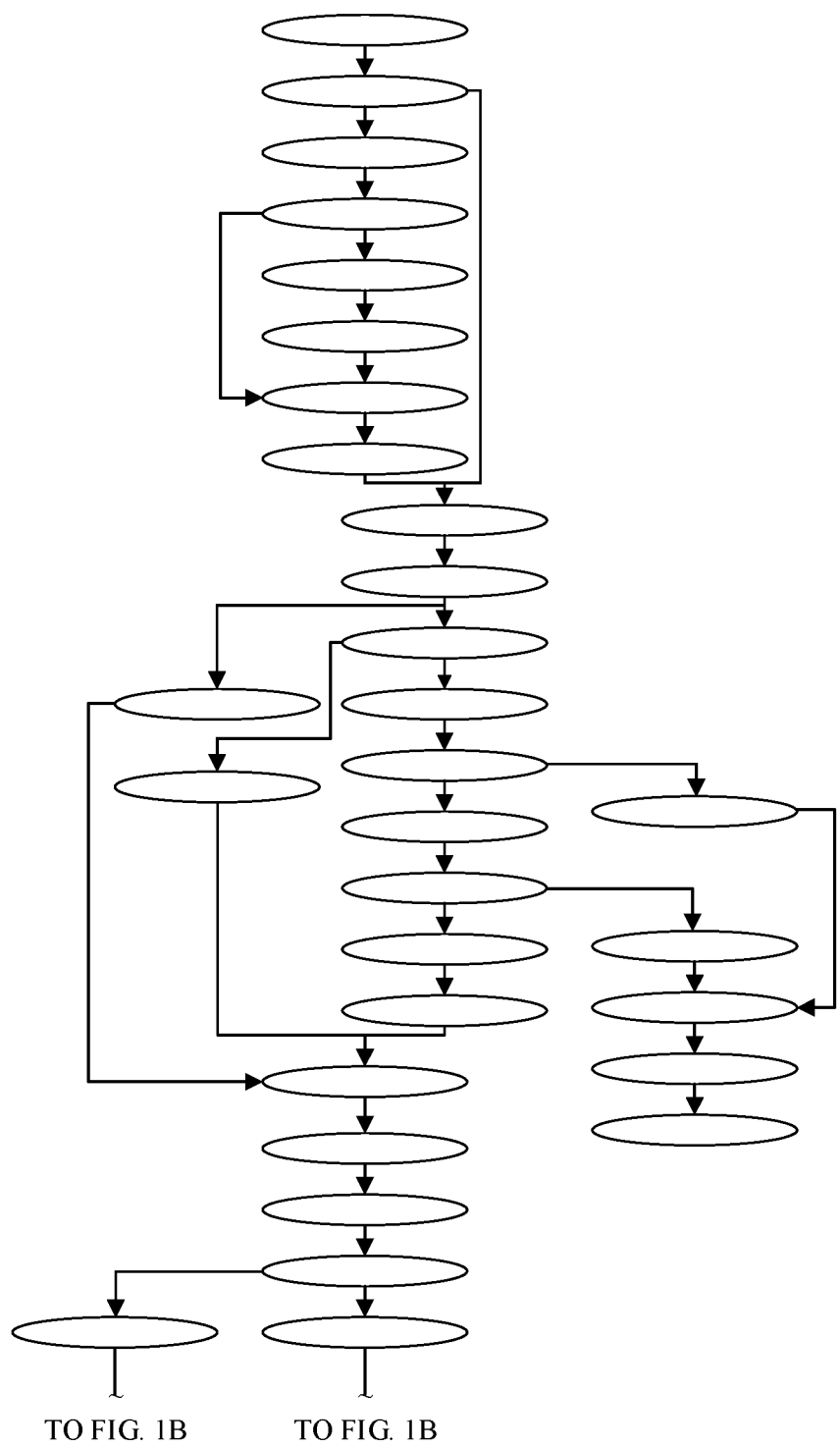
FIG. 1A and FIG. 1B are a schematic diagram of instructions included in a forwarding program according to an embodiment of this disclosure.

Terms used in an implementation part of this disclosure are merely used to explain embodiments of this disclosure, and are not intended to limit this disclosure. The following describes embodiments of this disclosure with reference to the accompanying drawings.

A program usually includes various types of instructions, and a branch instruction (jump, JMP) is one of them. For example, the branch instruction may be a conditional branch instruction. The conditional branch instruction is usually followed by two branches to be sequentially executed, one being a not taken branch and the other being a taken branch. When the not taken branch is executed, a next instruction that needs to be executed is the first instruction sequentially located after the conditional branch instruction in the program. When the taken branch is executed, a next instruction that needs to be executed is another instruction not adjacent to the conditional branch instruction. For example, the program jumps to an instruction in another program memory and executes the instruction.

A processor may use an instruction pipeline to complete an instruction execution process. The instruction pipeline includes at least an instruction fetch stage and an execution stage. The instruction fetch stage is for fetching an instruction to be executed, and the execution stage is for executing the instruction fetched in the instruction fetch stage, and determining a next instruction to be executed. If the processor waits for the branch instruction to pass the execution stage, and then sends a next instruction to be executed to the instruction fetch stage, a waiting process causes a pipeline stalled, resulting in a waste of time. Therefore, an instruction prediction method is required, to predict a next instruction to be executed before the next instruction to be executed is determined, so that the instruction can be sent to the instruction fetch stage in advance.

In related technologies, an instruction prediction method applicable to a general-purpose processor such as a central processing unit (CPU) is proposed based on a principle of locality. The principle of locality refers to a case in which the processor repeatedly accesses some data or accesses a location in a short period of time when accessing data. For a CPU program, because there are a large number of loop structures, a next instruction corresponding to a previous conditional branch instruction is related to a next instruction corresponding to a next conditional branch instruction, and next instructions corresponding to two conditional branch instructions of a same type and opposite conditions are related, the CPU program is applicable to the principle of locality. Therefore, the CPU is applicable to the instruction prediction method provided based on the principle of locality.

However, because a service of a network processor is far more random than the CPU program, the instruction prediction method designed based on characteristics of the CPU program in the related technologies is not suitable for the service of the network processor. From a micro perspective, a single processing core of the CPU executes a program for a long period of time, which is of typical locality. However, a process of forwarding a single data packet by the network processor is very short, one processing core processes all types of data packets, and processes of forwarding two adjacent data packets may be completely different. Therefore, a processing result of a previous data packet is of no reference value for processing a next data packet, so that the principle of locality is not applicable. From a macro perspective, for a node device on an access network or a metropolitan area network, types of networks that the node device accesses are diverse. Therefore, configurations on different interfaces vary greatly, and packet types vary greatly. For the node device, a quantity of received packets of each type does not vary greatly, and processes of forwarding a specific type of packets do not account for a majority of forwarding cases. Therefore, for a network processor configured to execute the forwarding process in the node device, processes of forwarding a specific type of data packets do not account for a majority of forwarding cases. The principle of locality is not applicable.

Figure 1B:
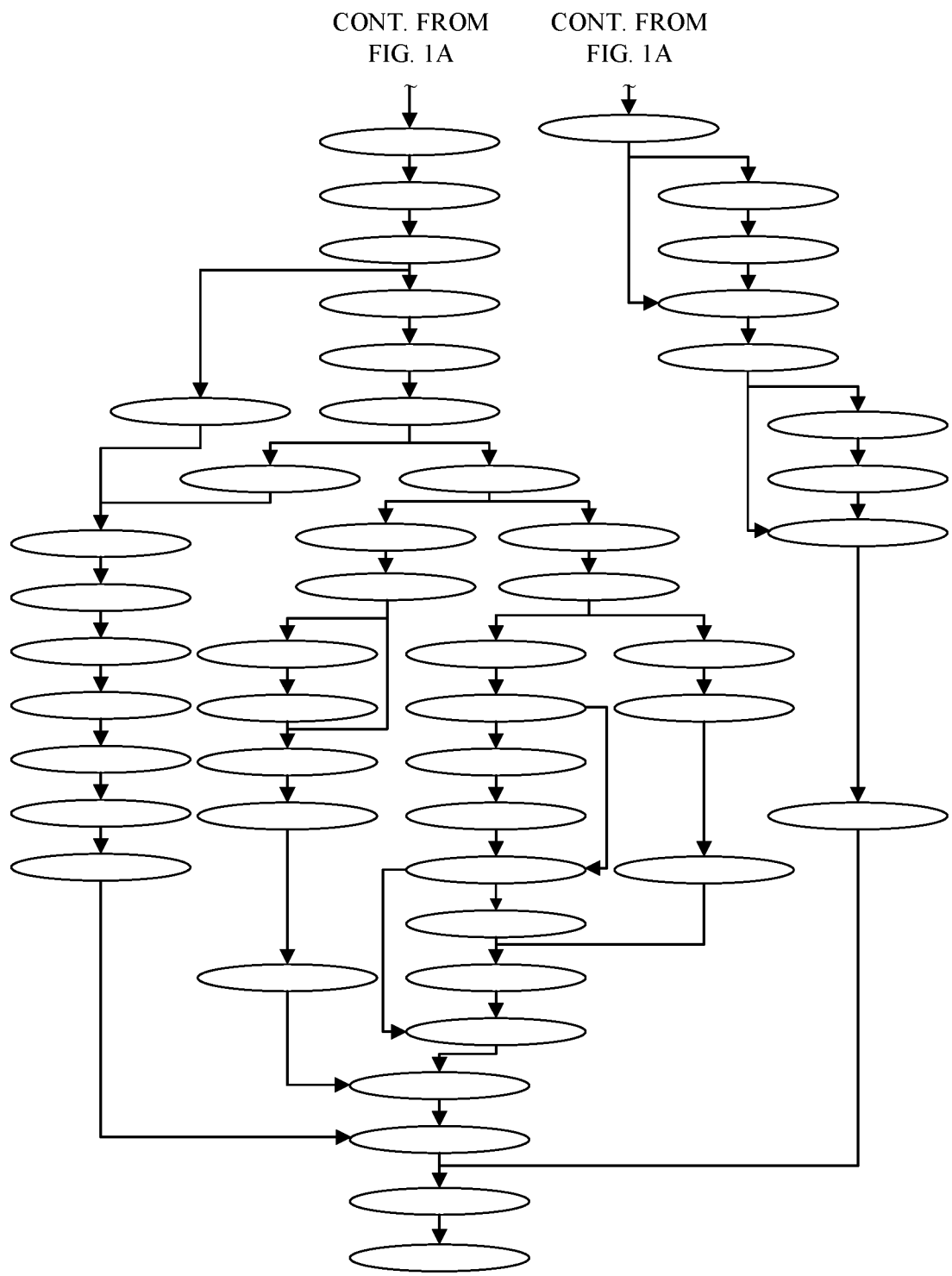

In addition, based on a schematic diagram of instructions included in a forwarding program according to an embodiment of this disclosure shown in FIG. 1A and FIG. 1B, the instructions shown in FIG. 1A and FIG. 1B are only some of the instructions included in the forwarding program. One ellipse represents one instruction, and an arrow indicates an execution sequence of the instructions. It can be learned from FIG. 1A and FIG. 1B that a process of the forwarding program is linearly downward, and does not have the characteristics of the CPU program. The instruction prediction method designed based on the characteristics of the CPU program is not applicable to the network processor.

Embodiments of this disclosure provide an instruction prediction method, which is applicable to a processor such as a network processor and a CPU that process a service with high randomness, and has a wide disclosure scope. The network processor may be a real time communication (RTC) type network processor. For ease of understanding, nouns in embodiments of this disclosure are first explained:

IB: also referred to as a basic block. The IB has following characteristics: (1) There is only one entry, instructions in the IB are sequentially executed, and branch instructions of other IBs can jump to execute only the first instruction in the IB. (2) There is only one exit. A program can start executing code in different IBs only after the last instruction in the IB is executed. In other words, for one IB, if the first instruction in the IB is executed, other instructions in the IB need to be sequentially executed once. An IB entry is a target of the last branch instruction of one or more IBs, and an IB exit is one branch instruction jumping to another IB.

Figure 2:
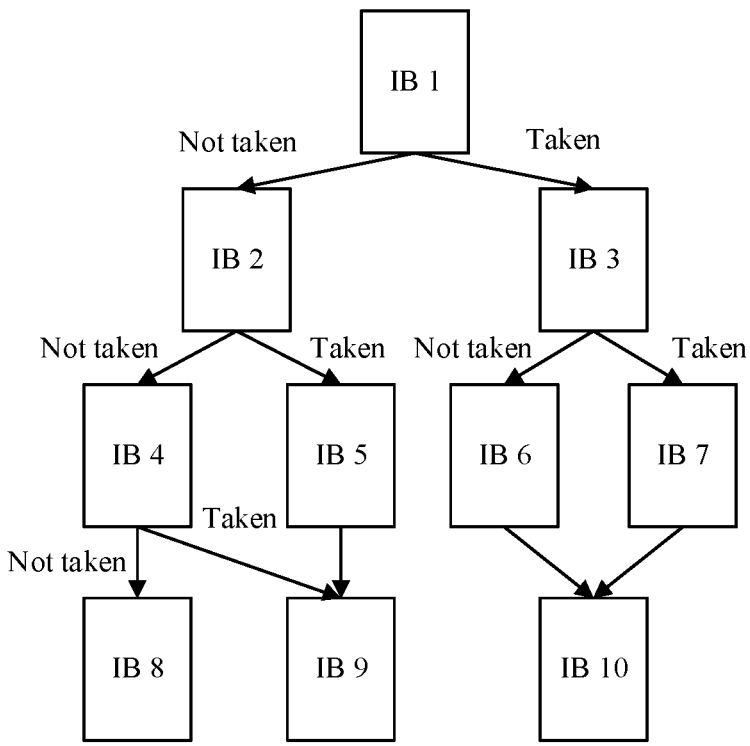
FIG. 2 is a schematic diagram of an IB group according to an embodiment of this disclosure.

IB group: refers to a segment of continuous IBs that have a successive relationship, and the successive relationship may also be referred to as a jump relationship. For example, for any two IBs, if a previous IB executes a next IB in a manner of executing a not taken branch or executing a taken branch, the two IBs have a jump relationship. Based on cases of executed branches, the jump relationship between the two IBs includes but is not limited to the following two cases: If the executed branch is a not taken branch, the jump relationship between a previous IB and a next IB is that the previous IB executes the not taken branch to execute the next IB. If the executed branch is a taken branch, the jump relationship between a previous IB and a next IB is that the previous IB executes the taken branch to execute the next IB. For example, if a previous IB executes a next IB in an unconditional jumping manner, that is, the previous IB has only one branch of the next IB, the two IBs also have a jump relationship. The jump relationship between the two IBs is that the previous IB executes unconditional jumping to execute the next IB. FIG. 2 is a schematic diagram of an IB group according to an embodiment of this disclosure. FIG. 2 shows 10 IBs, which are respectively IB 1, IB 2, . . . , and IB 10. IB 1 is used as an example. If IB 1 executes a not taken branch, IB 2 is executed. If IB 1 executes a taken branch, IB 3 is executed. Both IB 2 and IB 3 are following branches of IB 1, that is, IB 1 has a jump relationship with IB 2 and IB 3. For IB 5, IB 5 executes unconditional jumping to execute IB 9, and IB 5 has a jump relationship with IB 9. Principles of jump relationships between other IBs in FIG. 2 are the same. Details are not described herein again. Therefore, the 10 IBs shown in FIG. 2 form five IB groups in total. For ease of description, the IB groups are respectively referred to as IB group 1, IB group 2, . . . , and IB group 5. IB group 1 is IB 1→IB 2→IB 4→IB 8, IB group 2 is IB 1→IB 2→IB 4→IB 9, IB group 3 is IB 1→IB 2→IB 5→IB 9, IB group 4 is IB 1→IB 3→IB 6→IB 10, and IB group 5 is IB 1→IB 3→IB 7→IB 10. An IB group may be referred to as an execution path. For example, for IB group 1, IB 1→IB 2→IB 4→IB 8 is referred to as an execution path from IB 1 to IB 8. A jump relationship between the IBs is as follows: IB 1 executes a not taken branch to execute IB 2, IB 2 executes a not taken branch to execute IB 4, and IB 4 executes a not taken branch to execute IB 8. Principles of other IB groups are the same as that of IB group 1. Details are not described herein again.

Figure 3:
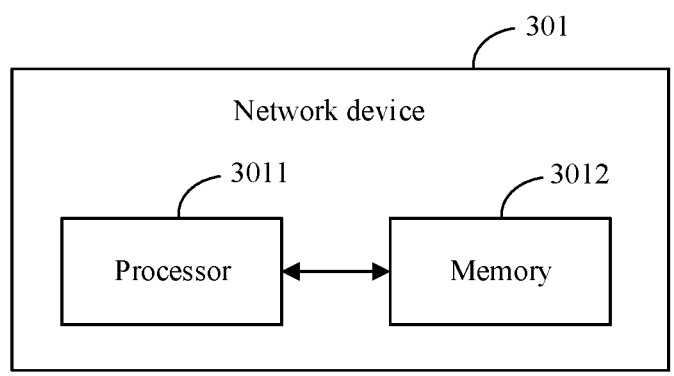
FIG. 3 is a schematic diagram of an implementation environment of an instruction prediction method according to an embodiment of this disclosure.

The instruction prediction method provided in embodiments of this disclosure may be applied to an implementation environment shown in FIG. 3. As shown in FIG. 3, the implementation environment includes a computer system, for example, a network device 301. The network device 301 includes a processor 3011 and a memory 3012. The processor 3011 is connected to the memory 3012. The memory 3012 is configured to store instructions included in a program. The processor 3011 is configured to invoke and execute the instructions in the memory 3012, to perform the instruction prediction method provided in embodiments of this disclosure. A quantity of processors 3011 and a quantity of memories 3012 shown in FIG. 3 are merely examples for description in embodiments of this disclosure. This is not limited in embodiments of this disclosure.

Figure 4:
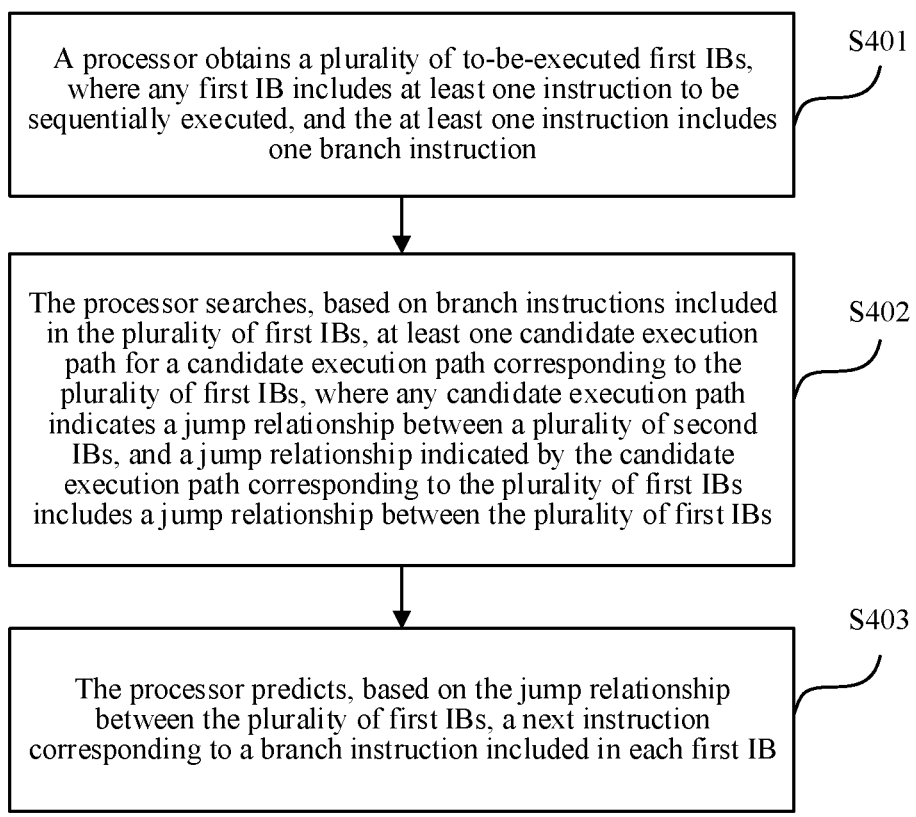
FIG. 4 is a flowchart of an instruction prediction method according to an embodiment of this disclosure.

The instruction prediction method provided in embodiments of this disclosure may be shown in FIG. 4. The following describes the instruction prediction method provided in embodiments of this disclosure with reference to the implementation environment shown in FIG. 3. As shown in FIG. 4, the method includes but is not limited to S401 to S403.

S401. A processor obtains a plurality of to-be-executed first IBs, where any first IB includes at least one instruction to be sequentially executed, and the at least one instruction includes one branch instruction.

In a possible implementation, a program context includes a plurality of to-be-executed instructions, and the plurality of instructions include a branch instruction. The processor obtains the plurality of to-be-executed instructions from the program context, to obtain the plurality of to-be-executed first IBs. For example, the program context may correspond to a type of a data packet. After receiving a data packet, the processor executes a forwarding program to forward the data packet, and the forwarding program includes a plurality of instructions. For different types of data packets, the processor may obtain different program contexts in a process of executing the forwarding program. The plurality of instructions included in the program context are all or some of the plurality of instructions included in the forwarding program.

For example, after obtaining the plurality of to-be-executed instructions, the processor obtains the plurality of first IBs based on the branch instruction in the plurality of instructions. A manner of obtaining the plurality of first IBs is not limited in this embodiment of this disclosure. For example, the processor identifies a branch instruction in the plurality of instructions, and divides the plurality of instructions into the plurality of first IBs based on the identified branch instruction. For any first IB in the plurality of first IBs, the last instruction included in the first IB is a branch instruction. A quantity of instructions included in each first IB is not limited in this disclosure. In other words, for any first IB in the plurality of first IBs, the first IB includes at least one instruction, and the at least one instruction includes one branch instruction.

S402. The processor searches, based on branch instructions included in the plurality of first IBs, at least one candidate execution path for a candidate execution path corresponding to the plurality of first IBs, where any candidate execution path indicates a jump relationship between a plurality of second IBs, and a jump relationship indicated by the candidate execution path corresponding to the plurality of first IBs includes a jump relationship between the plurality of first IBs.

For example, for any candidate execution path in the at least one candidate execution path, the candidate execution path is an IB group. In other words, for any candidate execution path, a plurality of IBs included in the IB group are a plurality of second IBs, and a jump relationship between the IBs in the IB group is the jump relationship that is indicated by the candidate execution path and that is between the plurality of second IBs. For example, the at least one candidate execution path includes IB group 1, IB group 3, and IB group 4 in the foregoing five IB groups. In other words, the at least one candidate execution path includes IB 1→IB 2→IB 4→IB 8, IB 1→IB 2→IB 4→IB 9, and IB 1→IB 3→IB 6→IB 10. According to the instructions included in the forwarding program shown in FIG. TA and FIG. 1B, it can be learned that the forwarding program is very complex, and a quantity of IB groups included in the forwarding program is extremely large. Therefore, a product person may select, based on a requirement, a scenario in which performance needs to be ensured, and determine an IB group corresponding to the selected scenario as the at least one candidate execution path. Because the at least one candidate execution path may be determined by the product person, accuracy of the at least one candidate execution path is relatively high. The at least one candidate execution path may be stored in a storage, so that the processor may obtain, based on the storage, the candidate execution path corresponding to the plurality of first IBs.

In a possible implementation, in addition to the at least one candidate execution path, the storage further stores a key corresponding to each of the at least one candidate execution path, and the processor may obtain, based on the key that corresponds to each of the at least one candidate execution path and that is stored in the storage, the candidate execution path corresponding to the plurality of first IBs. For example, the searching, based on branch instructions included in the plurality of first IBs, at least one candidate execution path for a candidate execution path corresponding to the branch instructions included in the plurality of first IBs includes: obtaining, based on the branch instructions included in the plurality of first IBs, a key corresponding to the plurality of first IBs, where different keys correspond to different candidate execution paths; searching the at least one candidate execution path for a candidate execution path corresponding to the key; and using the candidate execution path corresponding to the key as the candidate execution path corresponding to the plurality of first IBs.

For example, the obtaining, based on the branch instructions included in the plurality of first IBs, a key corresponding to the plurality of first IBs includes: combining the branch instructions included in the plurality of first IBs to obtain the key corresponding to the plurality of first IBs. A manner of combining the branch instructions to obtain the key is not limited in this embodiment of this disclosure. The processor may directly combine the branch instructions to obtain the key, or may first process the branch instructions and combine processing results to obtain the key. For example, the processor first performs calculation on the branch instructions to obtain identifier values of the branch instructions, and combines the identification values of the branch instructions to obtain the key.

A manner of searching the at least one candidate execution path for the candidate execution path corresponding to the key is not limited in this embodiment of this disclosure. For example, the processor uses the key as a whole, and searches the at least one candidate execution path for the candidate execution path corresponding to the key. Alternatively, the processor hierarchically searches, based on parts of the key, the at least one candidate execution path for the candidate execution path corresponding to the key. Hierarchical searching refers to a manner of searching for the candidate execution path corresponding to the key by gradually narrowing down a search range. For example, if the key include three parts, the processor may search, based on a first part, the at least one candidate execution path for a candidate execution path corresponding to the first part; search, based on a second part, the candidate execution path corresponding to the first part for a candidate execution path corresponding to the second part; and then search, based on a third part, the candidate execution path corresponding to the second part for a candidate execution path corresponding to the third part, and use the candidate execution path corresponding to the third part as the candidate execution path corresponding to the key.

Figure 5:
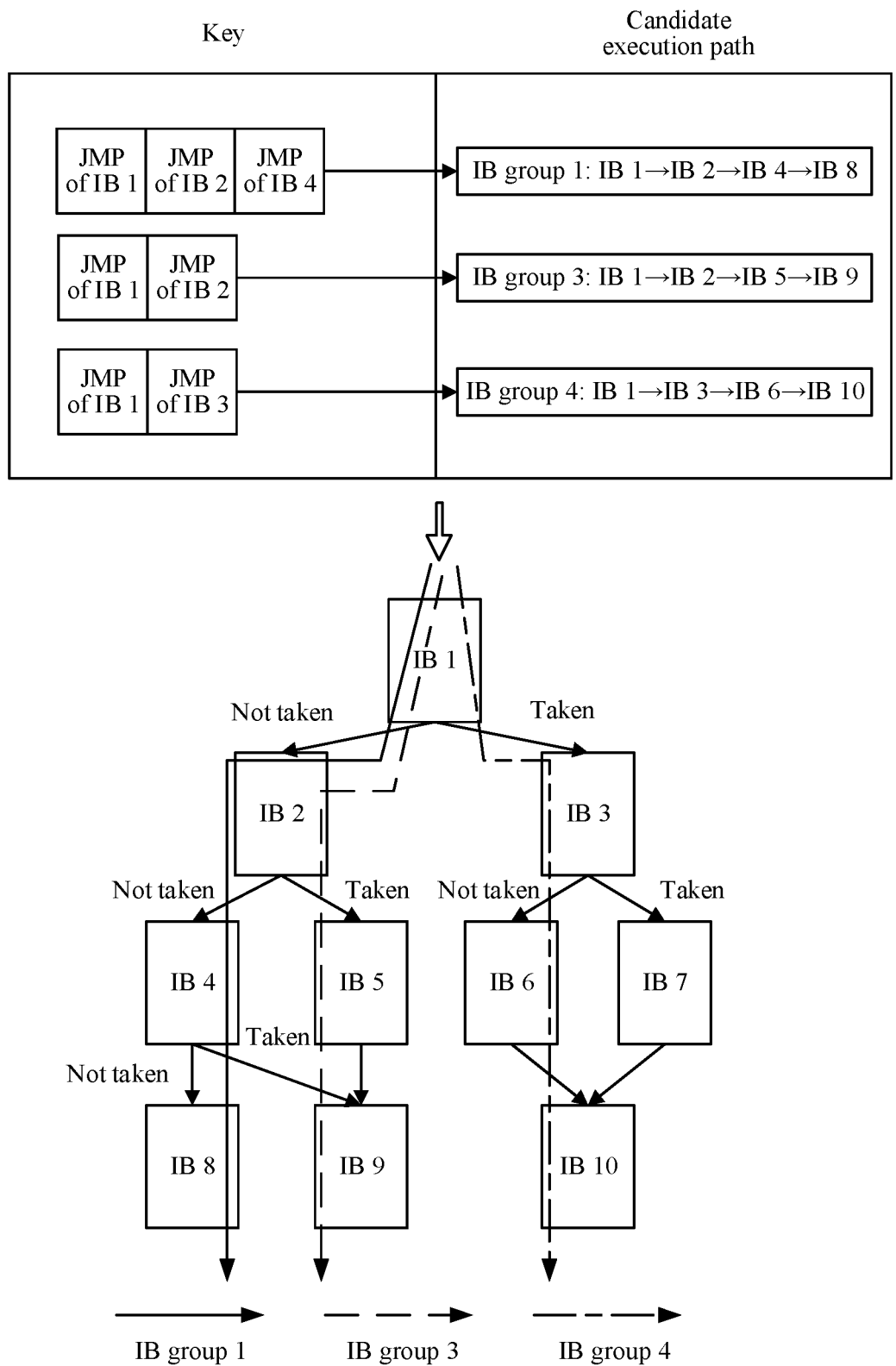
FIG. 5 is a schematic diagram of a process of searching for a candidate execution path corresponding to a key according to an embodiment of this disclosure.

FIG. 5 is a schematic diagram of a process of searching for a candidate execution path corresponding to a key according to an embodiment of this disclosure. The key is obtained by directly combining branch instructions. FIG. 5 shows three keys, where the three keys correspond to three cases of a plurality of first IBs. For example, in a top-to-bottom sequence, there are corresponding cases in which the plurality of first IBs include IB 1, IB 2, and IB 4, the plurality of first IBs include IB 1 and IB 2, and the plurality of first IBs include IB 1 and IB 3. As shown in FIG. 5, in the top-to-bottom sequence, a first key is a key composed of a branch instruction (jump, JMP) of IB 1, JMP of IB 2, and JMP of IB 4, a second key is a key composed of JMP of IB 1 and JMP of IB 2, and a third key is a key composed of JMP of IB 1 and JMP of IB 3. The first key is used as an example to describe the searching process. The processor may search at least one candidate execution path for a candidate execution path corresponding to the key based on JMP of IB 1, JMP of IB 2, and JMP of IB 4 included in the key. As shown in FIG. 5, on the at least one candidate execution path, the candidate execution path corresponding to JMP of IB 1, JMP of IB 2, and JMP of IB 4 is IB 1→IB 2→IB 4→IB 8, that is, IB group 1 in the candidate execution paths shown in FIG. 5. A jump relationship that is between the plurality of first IBs and that is indicated by IB group 1 includes: IB 1 executes a not taken branch to execute IB 2, IB 2 executes a not taken branch to execute IB 4, and IB 4 executes a not taken branch to execute IB 8. Principles of other keys and candidate execution paths corresponding to the keys in FIG. 5 are the same as that of related content of the first key. Details are not described herein again. It can be learned from FIG. 5 that a jump relationship indicated by the candidate execution path corresponding to the plurality of first IBs include a jump relationship between the plurality of first IBs. For example, when the plurality of first IBs include IB 1, IB 2, and IB 4, and the candidate execution path corresponding to the plurality of first IBs is IB group 1, a jump relationship indicated by IB group 1 includes a jump relationship between IB 1 and IB 2 and a jump relationship between IB 2 and IB 4.

In a possible implementation, at least one candidate execution path and a key corresponding to the at least one candidate execution path are implemented in a multi-level storage manner. For example, a storage that stores the at least one candidate execution path further stores an index corresponding to each of the at least one candidate execution path, and the index corresponding to each of the at least one candidate execution path and a key corresponding to each index are stored in another memory other than the storage. In this case, the processor may perform, based on the memory and the storage, an operation of searching the at least one candidate execution path for a candidate execution path corresponding to the key.

For example, the searching the at least one candidate execution path for a candidate execution path corresponding to the key includes: inputting the key into the memory, obtaining a target index that is output by the memory and that corresponds to the key, searching the at least one candidate execution path stored in the storage for a candidate execution path corresponding to the target index, and using the candidate execution path corresponding to the target index as the candidate execution path corresponding to the key. The memory may be a ternary content addressable memory (TCAM), so that the target index corresponding to the key may be quickly obtained based on the TCAM.

Figure 6:
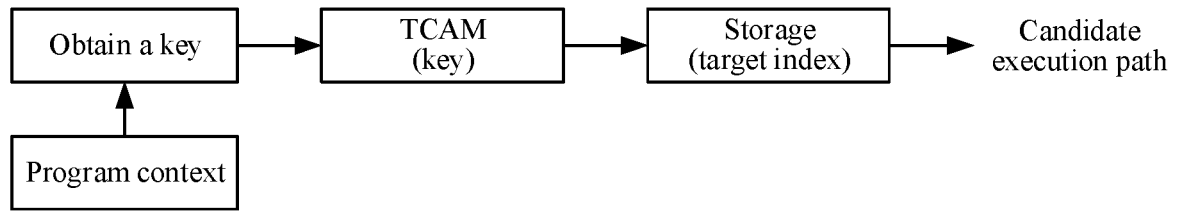
FIG. 6 is a schematic diagram of a process of obtaining a candidate execution path corresponding to a plurality of first IBs according to an embodiment of this disclosure.

FIG. 6 is a schematic diagram of a process of obtaining a candidate execution path corresponding to a plurality of first IBs according to an embodiment of this disclosure. FIG. 6 shows an overall process from obtaining the plurality of first IBs to obtaining the candidate execution path corresponding to the plurality of first IBs by a processor. As shown in FIG. 6, the processor obtains the plurality of first IBs from a program context, and obtains, based on branch instructions included in the plurality of first IBs, a key corresponding to the plurality of first IBs; inputs the key into a TCAM, to obtain a target index that is output by the TCAM and that corresponds to the key, where the TCAM stores an index corresponding to each of at least one candidate execution path and a key corresponding to each index; and accesses, by using the target index, a storage that stores the at least one candidate execution path and the index corresponding to each of the at least one candidate execution path, searches the storage for a candidate execution path corresponding to the target index, and uses the candidate execution path corresponding to the target index as the candidate execution path corresponding to the key, to use the candidate execution path as the candidate execution path corresponding to the plurality of first IBs.

For example, the TCAM includes at least one entry, and one entry corresponds to one key. The storage includes at least one entry, one entry corresponds to one candidate execution path, and a quantity of entries included in the storage is the same as a quantity of entries included in the TCAM. Logic for obtaining the key by the processor may be generated after a compiler compiles a forwarding program. Configuration data of the TCAM and content stored in the storage may alternatively be generated by the compiler and separately preloaded into the TCAM and the storage. This is not limited in this embodiment of this disclosure.

Because the at least one candidate execution path is determined based on the scenario in which performance needs to be ensured, and the determined candidate execution path is not obtained based on an actually determined to-be-executed instruction, a next instruction corresponding to some branch instructions may be obtained only after actual execution. Therefore, the at least one candidate execution path may not need to include all execution paths in the program. Correspondingly, the TCAM may not need to store indexes corresponding to all the execution paths and the key corresponding to each index, and the storage does not need to store the indexes corresponding to all the execution paths and the key corresponding to each index. Therefore, an excessively long key obtained by combining excessive branch instructions can be avoided, occupied storage resources are reduced, and implementation costs of obtaining the candidate execution path corresponding to the plurality of first IBs are reduced. In addition, because costs of the TCAM are relatively high, the storage that stores the at least one candidate execution path and the index corresponding to each of the at least one candidate execution path may be another storage other than the TCAM, so that costs are reduced.

S403. The processor predicts, based on the jump relationship between the plurality of first IBs, a next instruction corresponding to a branch instruction included in each first IB.

For example, for any first IB, a next instruction corresponding to a branch instruction included in the first IB is the first instruction included in the next first IB. For example, the plurality of first IBs include IB 1, IB 2, and IB 4, and a candidate execution path corresponding to the plurality of first IBs is IB 1→IB 2→IB 4→IB 8. For IB 1, a next instruction corresponding to a branch instruction included in IB 1 is the first instruction included in IB 2. For IB 2, a next instruction corresponding to a branch instruction included in IB 2 is the first instruction included in IB 4. For IB 4, a next instruction corresponding to a branch instruction included in IB 4 is the first instruction included in IB 8.

When the candidate execution path corresponding to the plurality of first IBs is not found in the at least one candidate execution path, according to the method provided in this embodiment of this disclosure, the next instruction corresponding to the branch instruction included in each first IB can also be predicted. The method can be flexibly applied to different cases. In a possible implementation, the method further includes: Based on that the candidate execution path corresponding to the plurality of first IBs is not found in the at least one candidate execution path, the processor determines that the jump relationship between the plurality of first IBs is a reference jump relationship, and predicts, based on the reference jump relationship, the next instruction corresponding to the branch instruction included in each first IB. For example, the reference jump relationship is "not taken".

Based on foregoing descriptions, for a conditional branch instruction, when a not taken branch is executed, the processor executes the first instruction sequentially located after the conditional branch instruction in the program, and when a taken branch is executed, the processor executes an instruction in a memory of another program. It takes time for the processor to convert from executing an instruction in a memory of a program to executing an instruction in a memory of another program. For example, the processor needs to wait for configuring an execution environment for the instruction, and may execute the instruction in the memory of the another program only after the configuration is completed. Therefore, when the reference jump relationship is not taken, if a next instruction predicted based on the not taken branch is a next instruction that actually needs to be executed, the processor may reduce a quantity of times of converting to execute the instruction in the memory of the another program, so that a waiting time period is shortened and instruction execution efficiency is improved.

In a possible implementation, that the processor determines that the jump relationship between the plurality of first IBs is a reference jump relationship includes: The processor adds a target instruction between the first IBs, where the target instruction indicates that the jump relationship between the first IBs is the reference jump relationship. For example, when the plurality of first IBs obtained by the processor include IB 1, IB 3, and IB 7, and the processor does not find, in the at least one candidate execution path, a candidate execution path corresponding to IB 1, IB 3, and IB 7, the processor adds a target instruction between IB 1 and IB 3, where the target instruction indicates that a jump relationship between IB 1 and IB 3 is the reference jump relationship; and adds a target instruction between IB 3 and IB 7, where the target instruction indicates that a jump relationship between IB 3 and IB 7 is the reference jump relationship. A manner of adding a target instruction by the processor is not limited in this embodiment of this disclosure. The processor may add the target instruction at the beginning or the end of each first IB. For example, in the foregoing case, the processor may separately add the target instruction before the first instruction of IB 1 and the first instruction of IB 3, or may separately add the target instruction after the last instruction of IB 1 and the last instruction of IB 3. An instruction type of the target instruction is not limited in this embodiment of this disclosure.

In a possible implementation, after the processor determines the jump relationship between the plurality of first IBs, the method further includes: The processor stores, based on the jump relationship between the plurality of first IBs, execution sequence information and storage address information of the plurality of first IBs in an IB queue, where the execution sequence information indicates execution sequences of the instructions included in the plurality of first IBs, and the storage address information indicates storage addresses of the instructions included in the plurality of first IBs; sequentially obtains the execution sequence information and the storage address information of the plurality of first IBs from the IB queue; and sequentially obtains the instructions based on the execution sequences indicated by the obtained execution sequence information and based on the storage addresses indicated by the obtained storage address information, and executes the obtained instructions. For example, for two instructions whose execution sequences are adjacent, an operation of executing the obtained former instruction is performed by the processor no earlier than an operation of obtaining the latter instruction based on a storage address of the latter instruction. In other words, before determining, based on the former instruction, a next instruction that needs to be executed, the processor performs the operation of obtaining the latter instruction based on the storage address of the latter instruction.

For example, for the execution sequence information and the storage address information that are of the plurality of first IBs and that are stored in the IB queue, the processor first obtains execution sequence information and storage address information that are of a first IB from the IB queue; sequentially obtains instructions based on the execution sequence indicated by the obtained execution sequence information and based on the storage address indicated by the obtained storage address information until all the instructions included in the first IB are obtained; and obtains execution sequence information and storage address information of a next first IB from the IB queue, and performs an operation similar to that of the previous first IB.

In a possible implementation, the storage address information of the plurality of first IBs includes start program counter (start PC) information and size information corresponding to each first IB. For any first IB, the start PC information indicates a storage address of the first instruction in the first IB, and the size information indicates a quantity of instructions included in the first IB. Because the IB queue stores start PC information and size information of each first IB, the IB queue may also be referred to as a multiple PC queue (MPC queue).

For example, the execution sequence information includes incrementally fetching instructions. For a first IB whose execution sequence information and storage address information are obtained, a process of fetching an instruction by the processor includes: The processor starts to incrementally fetch instructions based on a storage address indicated by the start PC information of the first IB until all instructions included in the first IB are fetched. For example, the starting to incrementally fetch instructions based on the storage address indicated by the start PC information includes: fetching the first instruction based on the storage address indicated by the start PC information, adding a reference value to the start PC information, fetching the second instruction based on a storage address indicated by PC information obtained by adding the reference value, and repeatedly performing an operation of adding a reference value and fetching an instruction based on a storage address indicated by PC information obtained by adding the reference value. The reference value may be determined based on experience or an actual requirement. This is not limited in this embodiment of this disclosure. For example, a storage address of an instruction is stored in a program counter (PC). In other words, the processor obtains the storage address of the instruction from the PC, and further obtains the instruction based on the storage address.

In a possible implementation, the processor performs, based on an instruction pipeline, an operation of sequentially obtaining instructions based on a storage address and executing the obtained instructions. For example, for two instructions whose execution sequences are adjacent, the processor performs, in an instruction fetch stage, an operation of obtaining the former instruction based on a storage address of the former instruction, and then sends the obtained former instruction to an execution stage. In addition, before sending the former instruction to the execution stage or when sending the former instruction to the execution stage, the processor performs, in the instruction fetch stage, an operation of obtaining the latter instruction based on a storage address of the latter instruction.

Figure 7:
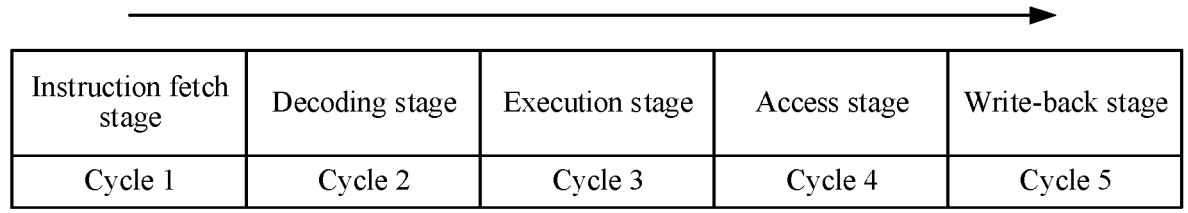
FIG. 7 is a schematic diagram of an instruction pipeline according to an embodiment of this disclosure.

FIG. 7 is a schematic diagram of an instruction pipeline according to an embodiment of this disclosure. As shown in FIG. 7, the instruction pipeline includes five stages: an instruction fetch stage, a decoding (decode) stage, an execution (execute) stage, an access stage, and a write-back stage. Each stage corresponds to one cycle. The instruction fetch stage is used to obtain a storage address of an instruction from a PC, fetch an instruction based on the storage address, and send the fetched instruction to the decoding stage. The decoding stage is for translating an instruction into a specific function operation, and sending the decoded instruction to the execution stage. The execution stage is for executing the decoded instruction. The access stage is for accessing a storage, for example, reading data from the storage. The write-back stage is for writing an execution result to a register or a memory. With reference to the instruction pipeline shown in FIG. 7, operations performed by the processor in each cycle are described. The processor obtains a storage address of an instruction from a PC in a first cycle, obtains the instruction based on the storage address, and predicts a next to-be-executed instruction. The processor sends the obtained instruction to the decoding stage in a second cycle, obtains a storage address of the next instruction from the PC, and obtains the next instruction based on the storage address. By analogy, stages executed by the processor in other cycles have the same principle. Details are not described herein again.

In a possible implementation, when the obtained instruction is a branch instruction, in response to a fact that a predicted next instruction corresponding to the branch instruction is different from a next instruction that needs to be executed, the method further includes: obtaining at least one to-be-executed third IB based on the next instruction that needs to be executed, and predicting a next instruction corresponding to a branch instruction included in the at least one third IB. If the predicted next instruction corresponding to the branch instruction is different from the next instruction that needs to be executed, it indicates that some instructions in the plurality of first IBs are not instructions that need to be executed. In this case, according to the method, a plurality of new to-be-executed instructions can be obtained, the at least one to-be-executed third IB can be further obtained, and the next instruction corresponding to the branch instruction include in the at least one third IB can be further predicted.

For example, after obtaining the instruction, the processor adds attribute information to the instruction. The attribute information indicates whether the instruction is a predicted instruction that needs to be executed or an actually determined instruction that needs to be executed. In this embodiment of this disclosure, attribute information of the predicted instruction that needs to be executed is predicted, and attribute information of the actually determined instruction that needs to be executed is accurate. Therefore, the processor may determine, in the execution stage based on attribute information of a received instruction, a type of the instruction, and when it is determined that the received instruction is a predicted instruction that needs to be executed, determine whether the predicted instruction that needs to be executed is the same as an instruction that actually needs to be executed.

For example, when the obtained instruction is a branch instruction, in response to a fact that a predicted next instruction corresponding to the branch instruction is different from a next instruction that needs to be executed, the processor deletes the execution sequence information and the storage address information that are of the plurality of first IBs and that are stored in the IB queue. The deletion operation may also be referred to as flush. For example, when the predicted instruction that needs to be executed is different from the instruction that actually needs to be executed, a circuit corresponding to the execution stage in the processor feeds back a storage address of the instruction that actually needs to be executed to a circuit corresponding to the instruction fetch stage in the processor. After receiving the feedback, the circuit corresponding to the instruction fetch stage flushes the execution sequence information and the storage address information that are of the plurality of first IBs and that are stored in the IB queue. Further, the circuit corresponding to the instruction fetch stage may obtain, based on the storage address of the instruction that actually needs to be executed, the instruction that actually needs to be executed, and perform an operation of obtaining at least one third IB.

For example, when the predicted instruction that needs to be executed is different from the instruction that actually needs to be executed, the processor marks an execution result of the predicted instruction that needs to be executed as a no-write-back state. The no-write-back state indicates that a circuit corresponding to a write-back stage does not write back the execution result of the instruction. For an instruction that is subsequently sent to the execution stage, the processor still marks an execution result of the instruction as a no-write-back state until an instruction obtained by the circuit corresponding to the instruction fetch stage is the instruction that actually needs to be executed. Correspondingly, the method may further include: For any instruction, the processor determines, based on a marking status of an execution result of the instruction, whether to write the execution result to a register or a memory. For example, after receiving an execution result, in response to a fact that the execution result is marked as a no-write-back state, the circuit corresponding to the write-back stage of the processor does not write the execution result to the register or the memory; and in response to a fact that the execution result is not marked as a no-write-back state, writes the execution result to the register or the memory. By marking the execution result, the processor may implement that the execution result is not written back, to avoid a waste of storage space caused by storage space occupation of the register or the memory by the execution result.

In a possible implementation, the processor updates a program context based on an execution result of an instruction, and obtains the at least one to-be-executed third IB from the updated program context. As the processor executes each instruction, the processor may update the program context based on an execution result of each instruction, and the updated program context includes a plurality of new to-be-executed instructions. Further, the processor may predict a next instruction corresponding to a branch instruction included in the at least one third IB. A principle of a manner in which the processor obtains the at least one to-be-executed third IB and predicts the next instruction corresponding to the branch instruction included in the at least one third IB is the same as that of the foregoing manner in which the processor obtains the plurality of first IBs and predicts the next instruction corresponding to the branch instruction included in each first IB. Details are not described herein again.

Figure 8:
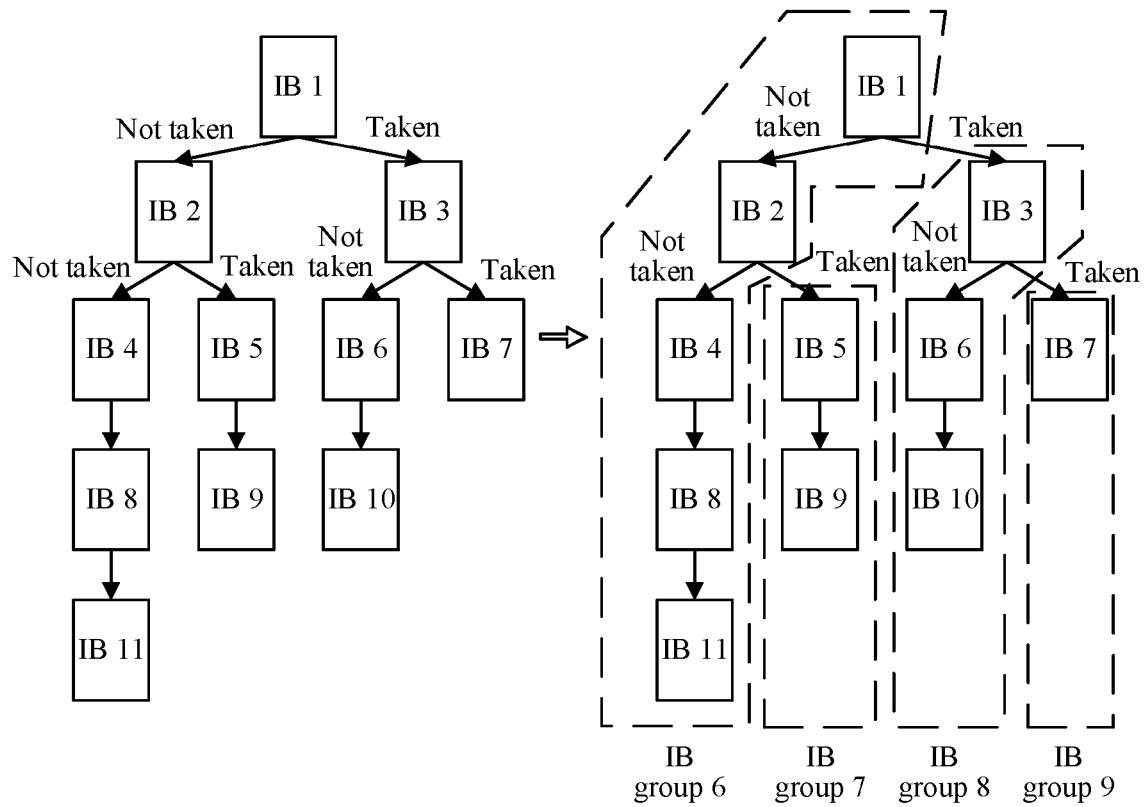
FIG. 8 is a schematic diagram of a process of obtaining an execution path corresponding to at least one third IB according to an embodiment of this disclosure.

FIG. 8 is a schematic diagram of a process of obtaining an execution path corresponding to at least one third IB according to an embodiment of this disclosure. By obtaining the execution path corresponding to the at least one third IB, the processor may predict a next instruction corresponding to a branch instruction included in each third IB. As shown in FIG. 8, the left side of FIG. 8 shows a plurality of instructions included in a program. A plurality of to-be-executed first IBs obtained by the processor include IB 1, IB 2, and IB 4, and a candidate execution path corresponding to the plurality of obtained first IBs is IB 1→IB 2→IB 4→IB 8→IB 11, that is, IB group 6 shown on the right side of FIG. 8. In a possible implementation, when executing a branch instruction of IB 2, the processor determines that a next instruction that actually needs to be executed is the first instruction of IB 5. In this case, the processor obtains, based on the first instruction of IB 5, at least one to-be-executed third IB, where the at least one third IB includes IB 5 and IB 9, and obtains an execution path corresponding to IB 5 and IB 9, where the obtained execution path is IB group 7 shown in FIG. 8, that is, IB 5→IB 9.

In another possible implementation, when executing a branch instruction of IB 1, the processor determines that a next instruction that actually needs to be executed is the first instruction of IB 3. In this case, the processor obtains, based on the first instruction of IB 3, at least one to-be-executed third IB, where the at least one third IB includes IB 3, IB 6, and IB 10, and obtains an execution path corresponding to IB 3, IB 6, and IB 10, where the obtained execution path is IB group 8 shown in FIG. 8, that is, IB 3→IB 6→IB 10.

In still another possible implementation, when executing a branch instruction of IB 3, the processor determines that a next instruction that actually needs to be executed is the first instruction of IB 7. In this case, the processor obtains, based on the first instruction of IB 7, at least one to-be-executed third IB, where the at least one third IB includes only IB 7.

Correspondingly, an obtained execution path includes only IB 7, that is, IB group 9 shown in FIG. 8.

In a possible implementation, the processor may be combined with a multi-thread technology. In other words, the processor supports invoking at least two threads. In this case, the processor may invoke any one of the at least two threads, and perform, on the thread, an operation of obtaining an instruction based on a storage address. For example, when the processor supports invoking two threads, the processor may perform, on any one of the two threads, an operation of obtaining an instruction based on a storage address.

Figure 9:
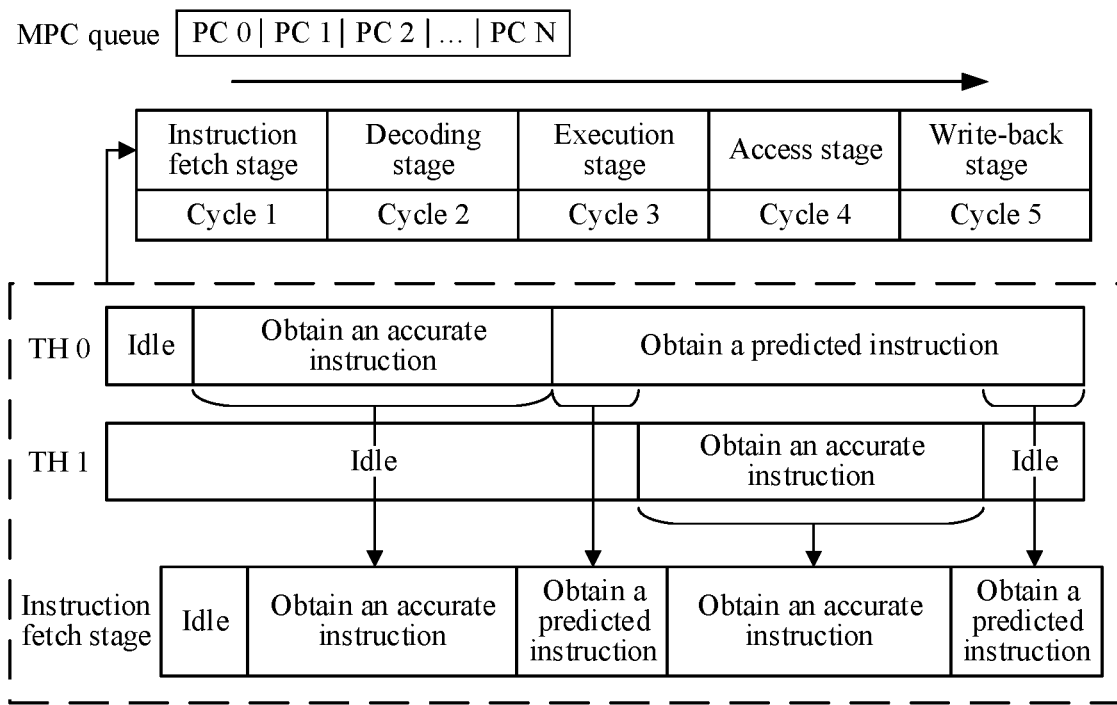
FIG. 9 is a schematic diagram of a process in which a processor fetches an instruction in an instruction fetch stage according to an embodiment of this disclosure.

A resource that is in the processor and that is used to perform the operation of obtaining an instruction based on a storage address may be scheduled by using a preemptable thread. The processor performs, on any one of the at least two threads, the operation of obtaining an instruction based on a storage address only when a resource is idle. FIG. 9 is a schematic diagram of a process in which a processor fetches an instruction in an instruction fetch stage according to an embodiment of this disclosure. The processor supports invoking two threads: thread (TH) 0 and TH 1. An MPC queue includes PC 0 to PC N, and PC 0 to PC N are sequentially corresponding to storage address information of each first IB. The storage address information includes start PC information, and N is an integer. An instruction fetched based on a storage address indicated by storage address information is referred to as a predicted instruction, and an instruction fetched based on a storage address of an instruction that actually needs to be executed is referred to as an accurate instruction.

As shown in FIG. 9, when the processor does not perform an operation of obtaining an accurate instruction on TH 1, and a state of TH 1 is idle, the processor performs an operation of obtaining a predicted instruction on TH 0. Therefore, in a time sequence, in the instruction fetch stage, the processor first performs the operation of obtaining an accurate instruction on TH 0, then performs the operation of obtaining a predicted instruction on TH 0, then performs the operation of obtaining an accurate instruction on TH 1, and finally performs the operation of obtaining a predicted instruction on TH 0. The operation of obtaining a predicted instruction is performed only when a resource is idle, so that the operation of obtaining a predicted instruction can be prevented from affecting the operation of obtaining an accurate instruction, thereby implementing zero penalty for an instruction fetching error.

For example, the processor includes at least one core. In the method provided in this embodiment of this disclosure, functions of the processor may be implemented by a core in the processor. For example, any core in the processor may invoke two threads.

In the method provided in this embodiment of this disclosure, at least one candidate execution path is searched for a candidate execution path corresponding to a plurality of first IBs, and based on a jump relationship that is between the plurality of first IBs and that is indicated by the candidate execution path corresponding to the plurality of first IBs, a next instruction corresponding to a branch instruction included in each first IB can be predicted. The method can be applied to a processor such as a network processor and a CPU with relatively high service randomness, and has a wide disclosure scope.

In addition, in the method, the candidate execution path corresponding to the plurality of first IBs is obtained based on the branch instructions included in the plurality of first IBs. Because the jump relationship indicated by the candidate execution path includes the jump relationship between the plurality of first IBs, the next instruction corresponding to the branch instruction included in each first IB can be directly predicted based on the jump relationship between the plurality of first IBs. Therefore, efficiency of predicting the next instruction corresponding to the branch instruction included in each first IB is relatively high.

In addition, because the jump relationship between the plurality of first IBs is indicated by the candidate execution path corresponding to the plurality of first IBs, the jump relationship between the plurality of first IBs may be different. In comparison with a manner in which an instruction corresponding to a branch is fixedly used as a next instruction to be executed in the related technologies, accuracy of the jump relationship between the plurality of first IBs obtained in the method is relatively high. Therefore, accuracy of predicting the next instruction corresponding to the branch instruction included in each first IB is relatively high, and instruction execution efficiency is relatively high.

In addition, when the functions of the processor are implemented by a core in the processor, and one core invokes two threads, instruction prediction implemented by using the method can improve core efficiency from 55% to more than 90%. Therefore, for core efficiency that needs to be achieved, the processor requires fewer cores, fewer areas, and lower implementation costs, power consumption, and latency.

Figure 10:
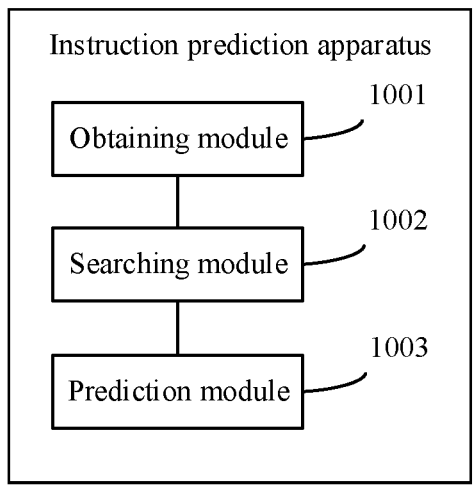
FIG. 10 is a schematic diagram of a structure of an instruction prediction apparatus according to an embodiment of this disclosure.

FIG. 10 is a schematic diagram of a structure of an instruction prediction apparatus according to an embodiment of this disclosure. For example, the apparatus is used in the processor shown in FIG. 4. Based on the following plurality of modules shown in FIG. 10, the instruction prediction apparatus shown in FIG. 10 may perform all or some operations performed by the processor. It should be understood that the apparatus may include more additional modules than the shown modules or omit some of the shown modules. This is not limited in this embodiment of this disclosure. As shown in FIG. 10, the apparatus includes:

an obtaining module 1001, configured to obtain a plurality of to-be-executed first instruction blocks IBs, where any first IB includes at least one instruction to be sequentially executed, and the at least one instruction includes one branch instruction;

a searching module 1002, configured to search, based on branch instructions included in the plurality of first IBs, at least one candidate execution path for a candidate execution path corresponding to the plurality of first IBs, where any candidate execution path indicates a jump relationship between a plurality of second IBs, and a jump relationship indicated by the candidate execution path corresponding to the plurality of first IBs includes a jump relationship between the plurality of first IBs; and a prediction module 1003, configured to predict, based on the jump relationship between the plurality of first IBs, a next instruction corresponding to a branch instruction included in each first IB.

In a possible implementation, the searching module 1002 is configured to: obtain, based on the branch instructions included in the plurality of first IBs, a key corresponding to the plurality of first IBs, where different keys correspond to different candidate execution paths; search the at least one candidate execution path for a candidate execution path corresponding to the key; and use the candidate execution path corresponding to the key as the candidate execution path corresponding to the plurality of first IBs.

In a possible implementation, the at least one candidate execution path and an index corresponding to each of the at least one candidate execution path are stored in a storage, and the index corresponding to each of the at least one candidate execution path and a key corresponding to each index are stored in a memory. The searching module 1002 is configured to: input the key into the memory, obtain a target index that is output by the memory and that corresponds to the key, search the at least one candidate execution path stored in the storage for a candidate execution path corresponding to the target index, and use the candidate execution path corresponding to the target index as the candidate execution path corresponding to the key.

In a possible implementation, the searching module 1002 is further configured to: determine, based on that the candidate execution path corresponding to the plurality of first IBs is not found in the at least one candidate execution path, that the jump relationship between the plurality of first IBs is a reference jump relationship; and predict, based on the reference jump relationship, the next instruction corresponding to the branch instruction included in each first IB.

In a possible implementation, the searching module 1002 is configured to add a target instruction between the first IBs, where the target instruction indicates that the jump relationship between the first IBs is the reference jump relationship.

In a possible implementation, the obtaining module 1001 is further configured to: store, based on the jump relationship between the plurality of first IBs, execution sequence information and storage address information of the plurality of first IBs in an IB queue, where the execution sequence information indicates execution sequences of the instructions included in the plurality of first IBs, and the storage address information indicates storage addresses of the instructions included in the plurality of first IBs; sequentially obtain the execution sequence information and the storage address information of the plurality of first IBs from the IB queue; and sequentially obtain the instructions based on the execution sequences indicated by the obtained execution sequence information and based on the storage addresses indicated by the obtained storage address information, and execute the obtained instructions.

In a possible implementation, the obtaining module 1001 is further configured to: when the obtained instruction is a branch instruction, in response to a fact that a predicted next instruction corresponding to the branch instruction is different from a next instruction that needs to be executed, obtain at least one to-be-executed third IB based on the next instruction that needs to be executed, and predict a next instruction corresponding to a branch instruction included in the at least one third IB.

In a possible implementation, the obtaining module 1001 is further configured to: when the obtained instruction is a branch instruction, in response to a fact that a predicted next instruction corresponding to the branch instruction is different from a next instruction that needs to be executed, delete the execution sequence information and the storage address information that are of the plurality of first IBs and that are stored in the IB queue.

In a possible implementation, the processor supports at least two threads, and the obtaining module 1001 is configured to perform, on any one of the at least two threads, an operation of obtaining an instruction based on a storage address.

In a possible implementation, the obtaining module 1001 is configured to: when a resource is idle, perform, on any one of the at least two threads, the operation of obtaining an instruction based on a storage address.

In the apparatus provided in this embodiment of this disclosure, at least one candidate execution path is searched for a candidate execution path corresponding to a plurality of first IBs, and based on a jump relationship that is between the plurality of first IBs and that is indicated by the candidate execution path corresponding to the plurality of first IBs, a next instruction corresponding to a branch instruction included in each first IB can be predicted. The apparatus can be applied to a processor such as a network processor and a CPU with relatively high service randomness, and has a wide disclosure scope.

In addition, the apparatus obtains, based on the branch instructions included in the plurality of first IBs, the candidate execution path corresponding to the plurality of first IBs. Because the jump relationship indicated by the candidate execution path includes the jump relationship between the plurality of first IBs, the next instruction corresponding to the branch instruction included in each first IB can be directly predicted based on the jump relationship between the plurality of first IBs. Therefore, efficiency of predicting the next instruction corresponding to the branch instruction included in each first IB is relatively high.

In addition, because the jump relationship between the plurality of first IBs is indicated by the candidate execution path corresponding to the plurality of first IBs, the jump relationship between the plurality of first IBs may be different. In comparison with a manner in which an instruction corresponding to a branch is fixedly used as a next instruction to be executed in the related technologies, accuracy of the jump relationship between the plurality of first IBs obtained in the method is relatively high. Therefore, accuracy of predicting the next instruction corresponding to the branch instruction included in each first IB is relatively high, and instruction execution efficiency is relatively high.

It should be understood that, when the apparatus provided in FIG. 10 implements functions of the apparatus, division into the foregoing functional modules is merely used as an example for description. In actual disclosure, the foregoing functions may be allocated to different functional modules for implementation based on a requirement. In other words, a device is divided into different functional modules in terms of an inner structure, to implement all or some of the functions described above. In addition, the apparatus provided in the foregoing embodiments and the method embodiments pertain to a same concept. For a specific implementation process of the apparatus, refer to the method embodiments. Details are not described herein again.

Figure 11:
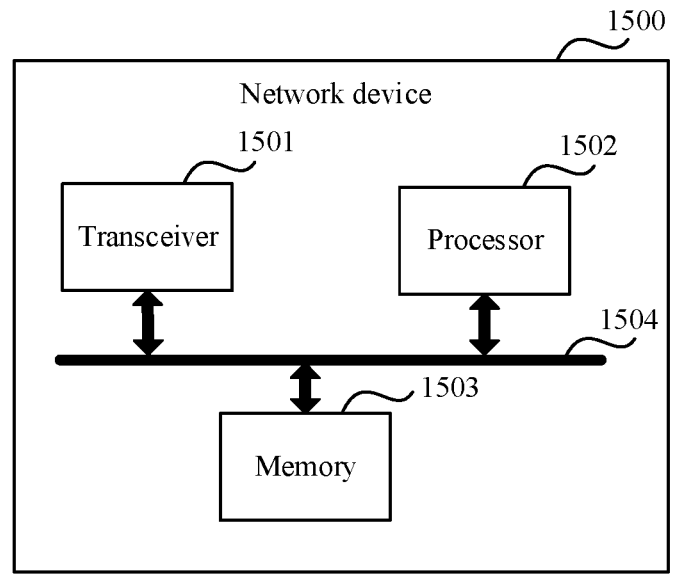
FIG. 11 is a schematic diagram of a structure of a network device according to an embodiment of this disclosure.

A specific hardware structure of the apparatus in the foregoing embodiments is shown in a computer system in FIG. 11, for example, a network device 1500, including a transceiver 1501, a processor 1502, and a memory 1503. The transceiver 1501, the processor 1502, and the memory 1503 are connected by using a bus 1504. The transceiver 1501 is configured to send data and receive data, the memory 1503 is configured to store instructions or program code, and the processor 1502 is configured to invoke the instructions or program code in the memory 1503, to enable the device to perform related processing steps of the processor in the foregoing method embodiments. In a specific embodiment, the network device 1500 in this embodiment of this disclosure may correspond to the processor in the foregoing method embodiments. The processor 1502 in the network device 1500 reads the instructions or program code in the memory 1503, to enable the network device 1500 shown in FIG. 11 to perform all or some operations performed by the processor.

The network device 1500 may alternatively correspond to the apparatus shown in FIG. 10. For example, the obtaining module 1001, the searching module 1002, and the prediction module 1003 in FIG. 10 are equivalent to the processor 1502.

Figure 12:
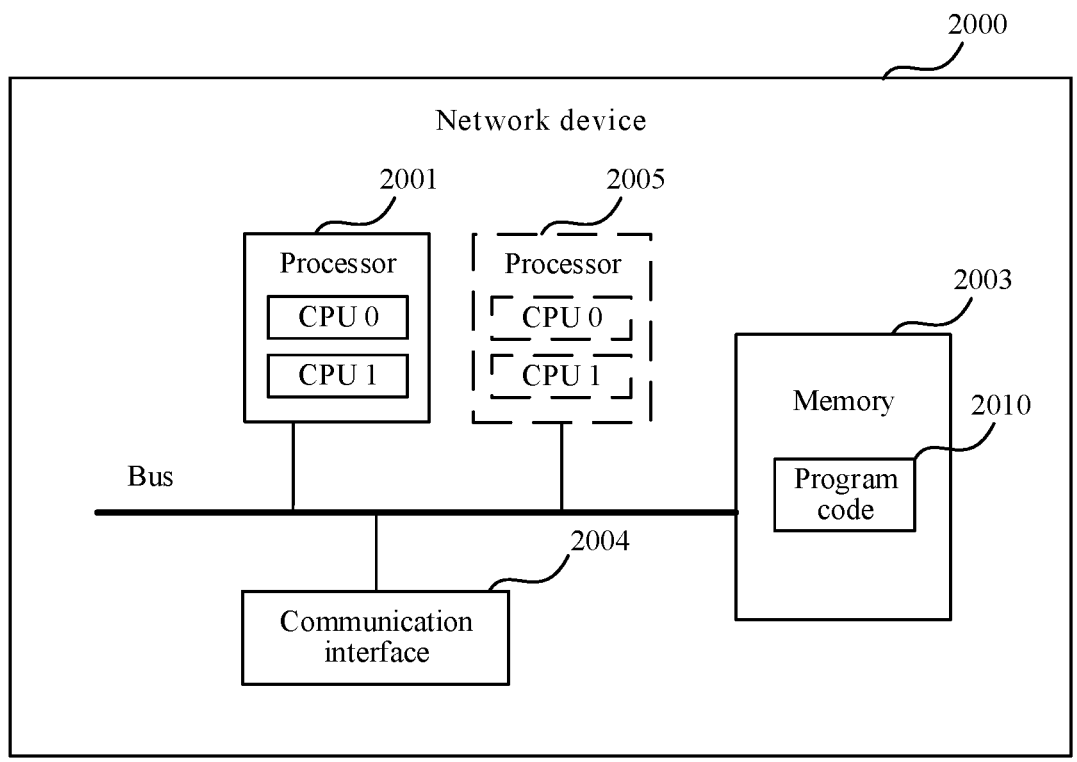
FIG. 12 is a schematic diagram of a structure of another network device according to an embodiment of this disclosure.

FIG. 12 shows a schematic diagram of a structure of a computer system such as a network device 2000 according to an example embodiment of this disclosure. The network device 2000 shown in FIG. 12 is configured to perform operations related to the instruction prediction method shown in FIG. 4. The network device 2000 is, for example, a switch or a router.

As shown in FIG. 12, the network device 2000 includes at least one processor 2001, a memory 2003, and at least one communication interface 2004.

The processor 2001 is, for example, a CPU, a digital signal processor (DSP), a network processor (NP), a graphics processing unit (GPU), a neural-network processing unit (NPU), a data processing unit (DPU), a microprocessor, or one or more integrated circuits configured to implement the solutions in this disclosure. For example, the processor 2001 includes an application-specific integrated circuit (ASIC), a programmable logic device (PLD) or another programmable logic device, a transistor logic device, a hardware component, or any combination thereof. The PLD is, for example, a complex programmable logic device (CPLD), a field-programmable gate array (FPGA), generic array logic (GAL), or any combination thereof. The processor 2001 may implement or execute various logical blocks, modules, and circuits described with reference to content disclosed in embodiments of the present disclosure. Alternatively, the processor may be a combination of processors implementing a computing function, for example, a combination of one or more microprocessors, or a combination of a DSP and a microprocessor.

Optionally, the network device 2000 further includes a bus. The bus is configured to transmit information between components of the network device 2000. The bus may be a peripheral component interconnect (PCI) bus, an extended industry standard architecture (EISA) bus, or the like. Buses may be classified into an address bus, a data bus, a control bus, and the like. For ease of representation, only one thick line is used for representing the bus in FIG. 12, but this does not mean that there is only one bus or only one type of bus. Components of the network device 2000 in FIG. 12 may be connected in another manner in addition to being connected by using a bus. A connection manner of the components is not limited in this embodiment of the present disclosure.

The memory 2003 is, for example, a read-only memory (ROM) or another type of static storage device that can store static information and instructions, a random access memory (RAM) or another type of dynamic storage device that can store information and instructions, or an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and that can be accessed by a computer, but is not limited thereto. For example, the memory 2003 exists independently, and is connected to the processor 2001 by using the bus. Alternatively, the memory 2003 may be integrated with the processor 2001.

The communication interface 2004 is configured to communicate with another device or a communication network by using any transceiver-type apparatus. The communication network may be the Ethernet, a radio access network (RAN), a wireless local area network (WLAN), or the like. The communication interface 2004 may include a wired communication interface, and may further include a wireless communication interface. The communication interface 2004 may be an Ethernet interface, a fast Ethernet (FE) interface, a gigabit Ethernet (GE) interface, an asynchronous transfer mode (ATM) interface, a wireless local area network (WLAN) interface, a cellular network communication interface, or a combination thereof. The Ethernet interface may be an optical interface, an electrical interface, or a combination thereof. In this embodiment of this disclosure, the communication interface 2004 may be used by the network device 2000 to communicate with another device.

During specific implementation, in an embodiment, the processor 2001 may include one or more CPUs, for example, a CPU 0 and a CPU 1 shown in FIG. 12. Each of the processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the network device 2000 may include a plurality of processors, for example, the processor 2001 and a processor 2005 shown in FIG. 12. Each of the processors may be a single-core processor (single-CPU) or a multi-core processor (multi-CPU). The processor herein may be one or more devices, circuits, and/or processing cores configured to process data (for example, computer program instructions).

During specific implementation, in an embodiment, the network device 2000 may further include an output device and an input device. The output device communicates with the processor 2001, and may display information in a plurality of manners. For example, the output device may be a liquid crystal display (LCD), a light emitting diode (LED) display device, a cathode ray tube (CRT) display device, or a projector. The input device communicates with the processor 2001, and may receive an input of a user in a plurality of manners. For example, the input device may be a mouse, a keyboard, a touchscreen device, or a sensing device.

In some embodiments, the memory 2003 is configured to store program code 2010 for performing the solutions of this disclosure, and the processor 2001 may execute the program code 2010 stored in the memory 2003. In other words, the network device 2000 may implement the instruction prediction method provided in the method embodiments by using the processor 2001 and the program code 2010 in the memory 2003. The program code 2010 may include one or more software modules. Optionally, the processor 2001 may also store program code or instructions for performing the solutions of this disclosure.

In a specific embodiment, the network device 2000 in this embodiment of this disclosure may correspond to the processor in the foregoing method embodiments. The processor 2001 in the network device 2000 reads the program code 2010 in the memory 2003 or the program code or instructions stored in the processor 2001, to enable the network device 2000 shown in FIG. 12 to perform all or some operations performed by the processor.

The network device 2000 may alternatively correspond to the apparatus shown in FIG. 10. Each functional module in the apparatus shown in FIG. 10 is implemented by using software of the network device 2000. In other words, the functional modules included in the apparatus shown in FIG. 10 are generated after the processor 2001 of the network device 2000 reads the program code 2010 stored in the memory 2003. For example, the obtaining module 1001, the searching module 1002, and the prediction module 1003 in FIG. 10 are equivalent to the processor 2001 and/or the processor 2005.

Steps of the method shown in FIG. 4 are completed by using an integrated logic circuit of hardware in the processor of the network device 2000 or by using instructions in a form of software. The steps of the method disclosed with reference to embodiments of this disclosure may be directly performed by a hardware processor, or may be performed by using a combination of hardware and a software module in the processor. The software module may be located in a mature storage medium in this art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware in the processor. To avoid repetition, details are not described herein again.

Figure 13:
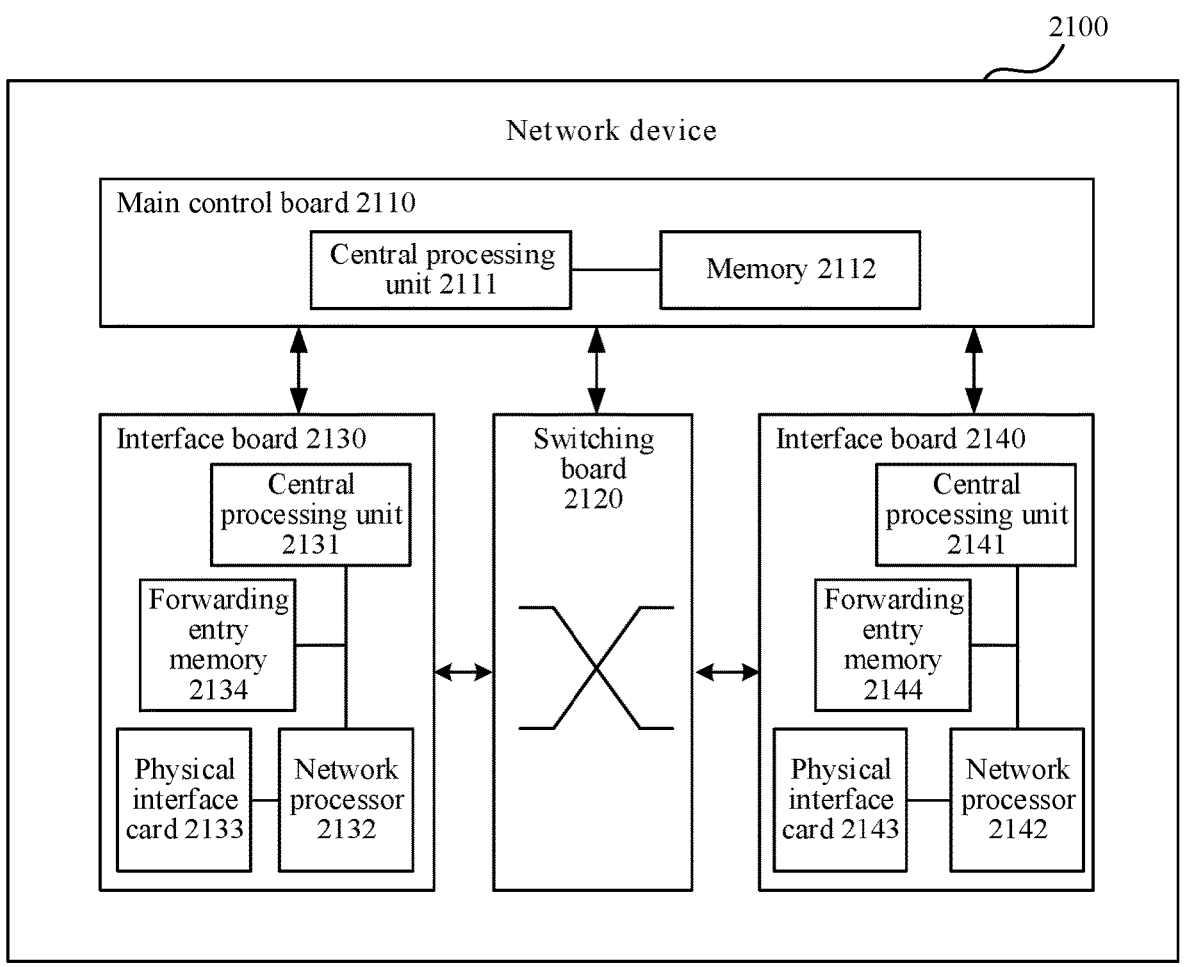
FIG. 13 is a schematic diagram of a structure of another network device according to an embodiment of this disclosure.

FIG. 13 shows a schematic diagram of a structure of a computer system such as a network device 2100 according to another example embodiment of this disclosure. The network device 2100 shown in FIG. 13 is configured to perform all or some operations related to the instruction prediction method shown in FIG. 4. The network device 2100 is, for example, a switch or a router, and the network device 2100 may be implemented by using a general bus architecture. As shown in FIG. 13, the network device 2100 includes: a main control board 2110 and an interface board 2130.

The main control board is also referred to as a main processing unit (MPU) or a route processor card. The main control board 2110 is configured to control and manage components in the network device 2100, including functions of route computation, device management, device maintenance, and protocol processing. The main control board 2110 includes: a central processing unit 2111 and a memory 2112.

The interface board 2130 is also referred to as a line processing unit (LPU), a line card, or a service board. The interface board 2130 is configured to provide various service interfaces, and implement data packet forwarding. The service interfaces include but are not limited to an Ethernet interface and a POS (packet over SONET/SDH) interface. The Ethernet interface is, for example, a flexible Ethernet service interface (flexible Ethernet client, FlexE Client). The interface board 2130 includes: a central processing unit 2131, a network processor 2132, a forwarding entry memory 2134, and a physical interface card (PIC) 2133.

The central processing unit 2131 on the interface board 2130 is configured to control and manage the interface board 2130 and communicate with the central processing unit 2111 on the main control board 2110.

The network processor 2132 is configured to implement packet forwarding processing. A form of the network processor 2132 may be a forwarding chip. The forwarding chip may be a network processor (NP). In some embodiments, the forwarding chip may be implemented by using an application-specific integrated circuit (disclosure-specific integrated circuit, SIC) or a field-programmable gate array (FPGA). Specifically, the network processor 2132 is configured to forward a received packet based on a forwarding table stored in the forwarding entry memory 2134. If a destination address of the packet is an address of the packet processing device 2100, the network processor 2132 sends the packet to a CPU (for example, the central processing unit 2131) for processing. If a destination address of the packet is not an address of the network device 2100, the network processor 2132 finds, based on the destination address, a next hop and an outbound interface that correspond to the destination address in the forwarding table, and forwards the packet to the outbound interface corresponding to the destination address. Processing on an uplink packet may include: processing at a packet inbound interface and forwarding table searching, and processing on a downlink packet may include: forwarding table searching and the like. In some embodiments, the central processing unit may also perform a function of the forwarding chip, for example, implement software forwarding based on a general-purpose CPU, so that the interface board does not need the forwarding chip.

The physical interface card 2133 is configured to implement a physical layer interconnection function. Original traffic enters the interface board 2130 from the physical interface card 2133, and a processed packet is sent out from the physical interface card 2133. The physical interface card 2133 is also referred to as a subcard, may be installed on the interface board 2130, and is responsible for converting an optical/electrical signal into a packet, performing validity check on the packet, and then forwarding the packet to the network processor 2132 for processing. In some embodiments, the central processing unit 2131 may alternatively perform a function of the network processor 2132, for example, implement software forwarding based on a general-purpose CPU, so that the physical interface card 2133 does not need the network processor 2132.

For example, the network device 2100 includes a plurality of interface boards. For example, the network device 2100 further includes an interface board 2140, and the interface board 2140 includes: a central processing unit 2141, a network processor 2142, a forwarding entry memory 2144, and a physical interface card 2143. Functions and implementations of components in the interface board 2140 are the same as or similar to those of the interface board 2130, and details are not described herein again.

For example, the network device 2100 further includes a switching board 2120. The switching board 2120 may also be referred to as a switch fabric unit (SFU). When the network device has a plurality of interface boards, the switching board 2120 is configured to complete data exchange between the interface boards. For example, the interface board 2130 and the interface board 2140 may communicate with each other by using the switching board 2120.

The main control board 2110 is coupled to the interface board. For example, the main control board 2110, the interface board 2130, the interface board 2140, and the switching board 2120 are connected to a system backboard by using a system bus for interworking. In a possible implementation, inter-process communication (IPC) channels are established between the main control board 2110 and the interface board 2130 and between the main control board 2110 and the interface board 2140, and communication between the main control board 2110 and the interface board 2130 and between the main control board 2110 and the interface board 2140 is performed through the IPC channels.

Logically, the network device 2100 includes a control plane and a forwarding plane. The control plane includes the main control board 2110 and the central processing unit 2111. The forwarding plane includes components used for forwarding, for example, the forwarding entry memory 2134, the physical interface card 2133, and the network processor 2132. The control plane performs the following functions: a function of a router, generating a forwarding table, processing signaling and a protocol packet, configuring and maintaining a network device state, and the like. The control plane delivers the generated forwarding table to the forwarding plane. On the forwarding plane, the network processor 2132 searches the forwarding table delivered by the control plane, and then forwards, based on the table, a packet received by the physical interface card 2133. The forwarding table delivered by the control plane may be stored in the forwarding entry memory 2134. In some embodiments, the control plane and the forwarding plane may be completely separated, and are not on a same network device.

It should be noted that, there may be one or more main control boards. When there are a plurality of main control boards, the main control boards may include an active main control board and a standby main control board. There may be one or more interface boards. A network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the network device may not need the switching board, and the interface board provides a function of processing service data in an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a packet processing device in the distributed architecture is greater than that of a packet processing device in a centralized architecture. For example, the network device may alternatively be in a form in which there is only one card. To be specific, there is no switching board, and functions of the interface board and the main control board are integrated on the card. In this case, the central processing unit on the interface board and the central processing unit on the main control board may be combined to form one central processing unit on the card, to perform functions obtained by combining the two central processing units. This form of network device (for example, a network device such as a low-end switch or a router) has a weak data exchange and processing capability. A specific architecture that is to be used depends on a specific networking deployment scenario. This is not limited herein.

In a specific embodiment, the network device 2100 corresponds to the instruction prediction apparatus shown in FIG. 10. In some embodiments, the obtaining module 1001, the searching module 1002, and the prediction module 1003 in the instruction detection apparatus shown in FIG. 10 are equivalent to the central processing unit 2111 or the network processor 2132 in the network device 2100.

It should be understood that the processor may be a central processing unit (CPU), or may be another general-purpose processor, a digital signal processor (digital signal processing, DSP), an application-specific integrated circuit (ASIC), a field-programmable gate array (FPGA) or another programmable logic device, a discrete gate or a transistor logic device, a discrete hardware component, or the like. The general-purpose processor may be a microprocessor or any conventional processor or the like. It should be noted that the processor may be a processor that supports an advanced reduced instruction set computing machines (advanced RISC machines, ARM) architecture.

Further, in an optional embodiment, the memory may include a read-only memory and a random access memory, and provide instructions and data for the processor. The memory may further include a non-volatile random access memory. For example, the memory may further store information of a device type.

The memory may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example, and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (direct rambus RAM, DR RAM).

A computer-readable storage medium is further provided. The storage medium stores at least one program instruction or code, and when the program instruction or code is loaded and executed by a processor, a computer is enabled to implement the instruction prediction method in FIG. 4.

This disclosure provides a computer program (product). When the computer program is executed by a computer, a processor or the computer is enabled to perform corresponding steps and/or procedures in the foregoing method embodiments.

A chip is provided. The chip includes a processor, configured to invoke, from a memory, instructions stored in the memory and run the instructions, to enable a network device on which the chip is installed to perform the methods in the foregoing aspects.

For example, the chip further includes an input interface, an output interface, and the memory. The input interface, the output interface, the processor, and the memory are connected through an internal connection path.

A device is further provided, and the device includes the foregoing chip. Optionally, the device is a network device. For example, the device is a router, a switch, or a server.

All or some of the foregoing embodiments may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on a computer, the procedures or functions according to this disclosure are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device such as a server or a data center that integrates one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

In the foregoing specific implementations, objectives, technical solutions, and beneficial effects of this disclosure are further described in detail. It should be understood that the foregoing descriptions are merely specific implementations of this disclosure, but are not intended to limit the protection scope of this disclosure. Any modification, equivalent replacement, improvement, or the like made based on the technical solutions of this disclosure shall fall within the protection scope of this disclosure.

A person of ordinary skill in the art may be aware that, with reference to the method steps and the modules described in embodiments disclosed in this specification, implementation can be performed by using software, hardware, firmware, or a combination thereof. To clearly describe the interchangeability between the hardware and the software, the foregoing has generally described steps and compositions of each embodiment based on functions. Whether the functions are performed by hardware or software depends on particular disclosures and design constraint conditions of the technical solutions. A person of ordinary skill in the art may use different methods to implement the described functions for each particular disclosure, but it should not be considered that the implementation goes beyond the scope of this disclosure.

A person of ordinary skill in the art may understand that all or some of the steps of embodiments may be implemented by hardware or a program instructing related hardware. The program may be stored in a computer-readable storage medium. The storage medium may be a read-only memory, a magnetic disk, an optical disc, or the like.

When software is used to implement embodiments, all or some of embodiments may be implemented in a form of a computer program product. The computer program product includes one or more computer program instructions. For example, the method in embodiments of this disclosure may be described in a context of a machine-executable instruction. The machine-executable instruction is included, for example, in a program module executed in a device on a real or virtual processor of a target. Usually, the program module includes a routine, a program, a library, an object, a class, a component, a data structure, and the like, and executes a specific task or implements a specific abstract data structure. In various embodiments, functions of program modules may be combined or split between the described program modules. The machine-executable instruction used for the program module may be executed locally or within a distributed device. In the distributed device, the program module may be located in both a local storage medium and a remote storage medium.

Computer program code used to implement the methods in embodiments of this disclosure may be written in one or more programming languages. The computer program code may be provided for a processor of a general-purpose computer, a dedicated computer, or another programmable instruction prediction apparatus, so that when the program code is executed by the computer or the another programmable instruction prediction apparatus, functions/operations specified in the flowcharts and/or block diagrams are implemented. The program code may be executed all on a computer, partially on a computer, as an independent software package, partially on a computer and partially on a remote computer, or all on a remote computer or server.

In a context of embodiments of this disclosure, the computer program code or related data may be carried by any appropriate carrier, so that a device, an apparatus, or a processor can perform various processing and operations described above. Examples of the carrier include a signal, a computer-readable medium, and the like.

Examples of the signal may include propagating signals in electrical, optical, radio, sound, or other forms, such as a carrier and an infrared signal.

The computer-readable medium may be any tangible medium that includes or stores a program used for or related to an instruction execution system, apparatus, or device. The machine-readable medium may be a machine-readable signal medium or a machine-readable storage medium. The machine-readable medium may include but is not limited to an electronic, magnetic, optical, electromagnetic, infrared, or semiconductor system, apparatus, or device, or any suitable combination thereof. More detailed examples of the machine-readable storage medium include an electrical connection with one or more wires, a portable computer disk, a hard disk, a random access memory (RAM), a read-only memory (ROM), an erasable programmable read-only memory (EPROM or flash memory), an optical storage device, a magnetic storage device, or any suitable combination thereof.

It may be clearly understood by a person skilled in the art that, for the purpose of convenient and brief description, for a detailed working process of the foregoing system, device, and module, refer to a corresponding process in the foregoing method embodiments. Details are not described herein.

In the several embodiments provided in this disclosure, it should be understood that the disclosed system, device, and method may be implemented in other manners. For example, the described device embodiment is merely an example. For example, division into the modules is merely logical function division and may be other division during actual implementation. For example, a plurality of modules or components may be combined or integrated into another system, or some features may be ignored or not performed. In addition, the displayed or discussed mutual couplings or direct couplings or communication connections may be implemented through some interfaces. Indirect couplings or communication connections between the devices or modules may be electrical connections, mechanical connections, or connections in other forms.

The modules described as separate parts may or may not be physically separate, and parts displayed as modules may or may not be physical modules, may be located in one position, or may be distributed on a plurality of network modules. Some or all of the modules may be selected based on actual requirements to achieve the objectives of the solutions in embodiments of this disclosure.

In addition, functional modules in embodiments of this disclosure may be integrated into one processing module, or each module may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this disclosure essentially, or the part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this disclosure. The foregoing storage medium includes any medium that can store program code, such as a USB flash drive, a removable hard disk, a read-only memory (read-only memory, ROM), a random access memory (random access memory, RAM), a magnetic disk, or an optical disc.

In this disclosure, terms such as "first" and "second" are used to distinguish between same items or similar items that have basically same functions. It should be understood that there is no logical or time sequence dependency between "first", "second", and "$n^{th}$", and a quantity and an execution sequence are not limited. It should also be understood that although terms such as "first" and "second" are used in the following descriptions to describe various elements, these elements should not be limited by the terms. These terms are merely used to distinguish one element from another element. For example, without departing from the scope of the various described examples, a first device may be referred to as a second device, and similarly, a second device may be referred to as a first device. Both the first device and the second device may be any type of network device, and in some cases, may be separate and different network devices.

It should be further understood that sequence numbers of processes do not mean execution sequences in embodiments of this disclosure. The execution sequences of the processes should be determined based on functions and internal logic of the processes, and should not be construed as any limitation on the implementation processes of embodiments of this disclosure.

In this disclosure, the term "at least one" means one or more, and the term "a plurality of" means two or more. For example, a plurality of second packets in this disclosure mean two or more second packets. The terms "system" and "network" may often be used interchangeably in this specification.

It should be understood that the terms used in the descriptions of various examples in this specification are merely intended to describe specific examples, but are not intended to constitute a limitation. The terms "one" ("a" and "an") and "the" of singular forms used in the descriptions of various examples and the appended claims are also intended to include plural forms, unless otherwise specified in the context clearly.

It should be further understood that the term "include" (or referred to as "includes", "including", "comprises", and/or "comprising"), when being used in this specification, specifies the presence of stated features, integers, steps, operations, elements, and/or components, but do not preclude the presence or addition of one or more other features, integers, steps, operations, elements, components, and/or groups thereof.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

It should be understood that determining B based on A does not mean that B is determined based on only A, and B may alternatively be determined based on A and/or other information.

It should further be understood that "one embodiment", "an embodiment", or "a possible implementation" mentioned throughout this specification means that particular features, structures, or characteristics related to embodiments or implementations are included in at least one embodiment of this disclosure. Therefore, "in one embodiment", "in an embodiment", or "in a possible implementation" appearing throughout this specification does not necessarily mean a same embodiment. In addition, these particular features, structures, or characteristics may be combined in one or more embodiments by using any appropriate manner.

What is claimed is:

1. A method comprising:
   obtaining, by a processor, a plurality of to-be-executed first instruction blocks (IBs), wherein each first IB comprises at least one instruction to be sequentially executed, and the at least one instruction of each first IB comprises one branch instruction;
   searching, based on the branch instructions comprised in the plurality of first IBs, at least one candidate execution path for a candidate execution path corresponding to the plurality of first IBs, wherein each of the at least one candidate execution paths indicates a jump relationship between a plurality of second IBs, and a jump relationship indicated by the candidate execution path corresponding to the plurality of first IBs comprises a jump relationship between the plurality of first IBs;
   predicting, based on the jump relationship between the plurality of first IBs, a next instruction corresponding to the branch instruction comprised in each of the plurality of first IBs; and
   determining, by the processor, based on the candidate execution path corresponding to the plurality of first IBs not being found in the at least one candidate execution path, that the jump relationship between the plurality of first IBs is a reference jump relationship; and
   predicting, based on the reference jump relationship, the next instruction corresponding to the branch instruction comprised in each of the plurality of first IBs, wherein the determining, by the processor, that the jump relationship between the plurality of first IBs is a reference jump relationship comprises:
   adding, by the processor, a target instruction between the plurality of first IBs, wherein the target instruction indicates that the jump relation-ship between the plurality of first IBs is the reference jump relationship.

2. The method according to claim 1, wherein the searching, based on the branch instructions comprised in the plurality of first IBs, at least one candidate execution path for a candidate execution path corresponding to the plurality of first IBs comprises:
   obtaining, based on the branch instructions comprised in the plurality of first IBs, a key corresponding to the plurality of first IBs, wherein different keys correspond to different candidate execution paths; and
   searching the at least one candidate execution path for a candidate execution path corresponding to the key, and using the candidate execution path corresponding to the key as the candidate execution path corresponding to the plurality of first IBs.

3. The method according to claim 2, wherein the at least one candidate execution path and an index corresponding to each of the at least one candidate execution path are stored in a storage, and the index corresponding to each of the at least one candidate execution path and a key corresponding to each index are stored in a memory; and the searching the at least one candidate execution path for a candidate execution path corresponding to the key comprises:

inputting the key corresponding to plurality of first IBs into the memory, obtaining a target index that is output by the memory and that corresponds to the key corresponding to the plurality of first IBs, searching the at least one candidate execution path stored in the storage for a candidate execution path corresponding to the target index, and using the candidate execution path corresponding to the target index as the candidate execution path corresponding to the key corresponding to the plurality of first IBs.

4. The method according to claim 1, wherein after the processor determines the jump relationship between the plurality of first IBs, the method further comprises:

storing, by the processor, based on the jump relationship between the plurality of first IBs, execution sequence information and storage address information of the plurality of first IBs in an IB queue, wherein the execution sequence information indicates execution sequences of the instructions comprised in the plurality of first IBs, and the storage address information indicates storage addresses of the instructions comprised in the plurality of first IBs;

sequentially obtaining the execution sequence information and the storage address information of the plurality of first IBs from the IB queue; and sequentially obtaining the instructions comprised in the plurality of first IBs based on the execution sequences indicated by the obtained execution sequence information and based on the storage addresses indicated by the obtained storage address information, and executing the obtained instructions.

5. The method according to claim 4, further comprising: when one of the obtained instructions is a branch instruction, in response to a predicted next instruction corresponding to the obtained branch instruction being different from a next instruction that needs to be executed, obtaining, by the processor, at least one to-be-executed third IB based on the next instruction that needs to be executed, and predicting a next instruction corresponding to a branch instruction comprised in the at least one third IB.

6. The method according to claim 4, further comprising: when one of the obtained instructions is a branch instruction, in response to a predicted next instruction corresponding to the obtained branch instruction being different from a next instruction that needs to be executed, deleting, by the processor, the execution sequence information and the storage address information that are of the plurality of first IBs and that are stored in the IB queue.

7. The method according to claim 4, wherein the processor supports at least two threads, and the processor performs, on any one of the at least two threads, an operation of obtaining an instruction based on a storage address.

8. The method according to claim 7, wherein that the processor performs, on any one of the at least two threads, an operation of obtaining an instruction based on a storage address comprises:

when a resource is idle, performing, by the processor, on any one of the at least two threads, the operation of obtaining an instruction based on a storage address.

9. An apparatus comprising a processor, wherein the processor is configured to execute program instructions to cause the apparatus to:

obtain a plurality of to-be-executed first instruction blocks (IBs), wherein each first IB comprises at least one instruction to be sequentially executed, and the at least one instruction of each first IB comprises one branch instruction;

search, based on the branch instructions comprised in the plurality of first IBs, at least one candidate execution path for a candidate execution path corresponding to the plurality of first IBs, wherein each of the at least one candidate execution paths indicates a jump relationship between a plurality of second IBs, and a jump relationship indicated by the candidate execution path corresponding to the plurality of first IBs comprises a jump relationship between the plurality of first IBs; and predict, based on the jump relationship between the plurality of first IBs, a next instruction corresponding to the branch instruction comprised in each of the plurality of first IBs;

determine, based on the candidate execution path corresponding to the plurality of first IBs not being found in the at least one candidate execution path, that the jump relationship between the plurality of first IBs is a reference jump relationship, and predict, based on the reference jump relationship, the next instruction corresponding to the branch instruction comprised in each of the plurality of first IBs, wherein the apparatus is further configured to add a target instruction between the plurality of first IBs, wherein the target instruction indicates that the jump relationship between the plurality of first IBs is the reference jump relationship.

10. The apparatus according to claim 9, wherein the apparatus is further configured to: obtain, based on the branch instructions comprised in the plurality of first IBs, a key corresponding to the plurality of first IBs, wherein different keys correspond to different candidate execution paths; search the at least one candidate execution path for a candidate execution path corresponding to the key; and use the candidate execution path corresponding to the key as the candidate execution path corresponding to the plurality of first IBs.

11. The apparatus according to claim 10, wherein the at least one candidate execution path and an index corresponding to each of the at least one candidate execution path are stored in a storage, and the index corresponding to each of the at least one candidate execution path and a key corresponding to each index are stored in a memory; and the apparatus is further configured to: input the key corresponding to the plurality of first IBs into the memory, obtain a target index that is output by the memory and that corresponds to the key corresponding to the plurality of first IBs, search the at least one candidate execution path stored in the storage for a candidate execution path corresponding to the target index, and use the candidate execution path corresponding to the target index as the candidate execution path corresponding to the key corresponding to the plurality of first IBs.

12. The apparatus according to claim 9, wherein the apparatus is further configured to: store, based on the jump relationship between the plurality of first IBs, execution sequence information and storage address information of the plurality of first IBs in an IB queue, wherein the execution sequence information indicates execution sequences of the instructions comprised in the plurality of first IBs, and the storage address information indicates storage addresses of the instructions comprised in the plurality of first IBs; sequentially obtain the execution sequence information and the storage address information of the plurality of first IBs from the IB queue; and sequentially obtain the instructions comprised in the plurality of first IBs based on the execution sequences indicated by the obtained execution sequence information and based on the storage addresses indicated by the obtained storage address information, and execute the obtained instructions.

13. The apparatus according to claim 12, wherein the apparatus is further configured to: when one of the obtained instructions is a branch instruction, in response to a predicted next instruction corresponding to the obtained branch instruction being different from a next instruction that needs to be executed, obtain at least one to-be-executed third IB based on the next instruction that needs to be executed, and predict a next instruction corresponding to a branch instruction comprised in the at least one third IB.

14. The apparatus according to claim 12, wherein the apparatus is further configured to: when one of the obtained instructions is a branch instruction, in response to a predicted next instruction corresponding to the obtained branch instruction being different from a next instruction that needs to be executed, delete the execution sequence information and the storage address information that are of the plurality of first IBs and that are stored in the IB queue.

15. The apparatus according to claim 12, wherein the processor supports at least two threads, and the apparatus is further configured to perform, on any one of the at least two threads, an operation of obtaining an instruction based on a storage address.

16. The apparatus according to claim 15, wherein the apparatus is further configured to: when a resource is idle, perform, on any one of the at least two threads, the operation of obtaining an instruction based on a storage address.

\* \* \* \* \*